(12) United States Patent
Nakamura et al.

(10) Patent No.: US 10,432,875 B2
(45) Date of Patent: Oct. 1, 2019

(54) IMAGE PROCESSING APPARATUS, IMAGE PROCESSING METHOD, AND IMAGE SENSOR

(71) Applicant: SONY SEMICONDUCTOR SOLUTIONS CORPORATION, Asahi-cho, Atsugi-shi, Kanagawa (JP)

(72) Inventors: Shigeki Nakamura, Kanagawa (JP); Shun Kaizu, Kanagawa (JP)

(73) Assignee: SONY CORPORATION, Tokyo (JP)

(*) Notice: Subject to any disclaimer, the term of this patent is extended or adjusted under 35 U.S.C. 154(b) by 5 days.

(21) Appl. No.: 15/325,474

(22) PCT Filed: Jul. 17, 2015

(86) PCT No.: PCT/JP2015/070497
§ 371 (c)(1),
(2) Date: Jan. 11, 2017

(87) PCT Pub. No.: WO2016/017450
PCT Pub. Date: Feb. 4, 2016

(65) Prior Publication Data
US 2017/0150030 A1    May 25, 2017

(30) Foreign Application Priority Data
Jul. 31, 2014  (JP) ................ 2014-156530

(51) Int. Cl.
*H04N 5/235* (2006.01)
*H04N 5/374* (2011.01)
*H04N 5/357* (2011.01)

(52) U.S. Cl.
CPC ........... *H04N 5/2357* (2013.01); *H04N 5/374* (2013.01); *H04N 5/357* (2013.01)

(58) Field of Classification Search
None
See application file for complete search history.

(56) References Cited

U.S. PATENT DOCUMENTS 6,630,953 B1* 10/2003 Toyoda ............ H04N 5/235
                                              348/226.1
2007/0146501 A1* 6/2007 Matsuoka .......... H04N 5/235
                                              348/226.1
(Continued)

FOREIGN PATENT DOCUMENTS

JP     3522674 B2    4/2004
JP     4423889 B2    3/2010
(Continued)

OTHER PUBLICATIONS

Title: Least Squares Date Feb. 26, 2010 Web: https://web.archive.org/web/20100216183330/https://en.wikipedia.org/wiki/Least_squares (Year: 2010).*

*Primary Examiner* — Twyler L Haskins
*Assistant Examiner* — Wesley J Chiu
(74) *Attorney, Agent, or Firm* — Chip Law Group

(57) ABSTRACT

An image processing apparatus includes: a row integration ratio calculation unit that divides a first row integration value by a second row integration value for each row, to calculate a row integration ratio; a reference value generation unit that generates a reference value for each row; a reference value integration unit that multiplies the integration ratio by the reference value for each row and integrates multiplication results corresponding to all rows, to calculate a sum of the multiplication results of the integration ratios and the reference values; a flicker parameter estimation unit that estimates a flicker parameter of flicker generated in the first exposure image on the basis of the sum; and a flicker correction unit that corrects the flicker generated in the first exposure image on the basis of the estimated flicker parameter. The present disclosure can be applied to an image sensor.

19 Claims, 26 Drawing Sheets

(56) References Cited

U.S. PATENT DOCUMENTS

| | | | | |
|---|---|---|---|---|
| 2009/0028424 A1* | 1/2009 | Sato | ............... | G06T 5/007 |
| | | | | 382/162 |
| 2012/0002074 A1* | 1/2012 | Baba | ............... | H04N 5/235 |
| | | | | 348/228.1 |
| 2013/0271623 A1* | 10/2013 | Jo | ............... | H04N 5/2357 |
| | | | | 348/226.1 |
| 2014/0375848 A1* | 12/2014 | Yamamoto | ......... | H04N 5/2355 |
| | | | | 348/241 |

FOREIGN PATENT DOCUMENTS

| | | | |
|---|---|---|---|
| JP | 2011-091775 A | 5/2011 | |
| JP | 2013-121099 A | 6/2013 | |
| JP | WO 2013084605 A1 * | 6/2013 | ........... H04N 5/2355 |
| JP | 2013-219708 A | 10/2013 | |
| JP | 2014-050042 A | 3/2014 | |

\* cited by examiner

IMAGE PROCESSING APPARATUS, IMAGE PROCESSING METHOD, AND IMAGE SENSOR

CROSS REFERENCE TO RELATED APPLICATIONS

This application is a U.S. National Phase of International Patent Application No. PCT/JP2015/070497 filed on Jul. 17, 2015, which claims priority benefit of Japanese Patent Application No. JP 2014-156530 filed in the Japan Patent Office on Jul. 31, 2014. Each of the above-referenced applications is hereby incorporated herein by reference in its entirety.

TECHNICAL FIELD

The present disclosure relates to an image processing apparatus, an image processing method, a program, and an image sensor, and particularly to, an image processing apparatus, an image processing method, a program, and an image sensor that are capable of suppressing flicker that can be generated in a captured image.

BACKGROUND ART

As shown in FIG. 1, a lighting luminance of a lighting apparatus that is driven by an AC (alternating-current) power supply is known to have fluctuations at, for example, a frequency twice as large as an AC frequency thereof (50 Hz etc.). In such a situation, when imaging is performed with a CMOS (Complementary Metal Oxides Semiconductor) image sensor, an image obtained as a result of the imaging may have blinking stripes in a row direction (horizontal direction) as shown in FIG. 2. In general, this phenomenon is called flicker. The flicker is generated because the CMOS image sensor performs imaging by rolling shutter in which an exposure timing is shifted on a row by row basis.

In this regard, various proposals to cope with the flicker have been made in the past.

For example, Patent Literature 1 describes the invention in which an exposure time of a global shutter is set to be the integral multiple of a flicker period (fluctuation period of lighting luminance), to equalize fluctuations of the lighting luminance in the exposure time of each row and suppress the generation of the flicker. In this invention, however, since the exposure time depends on the flicker period, the exposure time for each row cannot be set to be shorter than the flicker period.

Further, Patent Literature 2 describes the invention in which frames captured in accordance with time corresponding to one phase of the flicker period are integrated to estimate a flicker-cancelled luminance state, and an estimation result and the current frame are compared to extract and correct a flicker component of the current frame. However, this invention cannot cope with flicker of a long period.

Additionally, Patent Literature 3 describes the invention in which an image of a long exposure time and an image of a short exposure time are sequentially captured, and a difference in luminance integration value is extracted for each row as flicker component and corrected.

CITATION LIST

Patent Literature

Patent Literature 1: Japanese Patent No. 3522674
Patent Literature 2: Japanese Patent No. 4423889
Patent Literature 3: Japanese Patent Application Laid-open No. 2011-91775

DISCLOSURE OF INVENTION

Technical Problem

In the inventions of Patent Literatures 2 and 3 described above, in addition to a frame to be corrected in which generated flicker is to be corrected, frames previously captured are also used. Thus, it is necessary to provide a memory for holding the frames and holding a flicker component extracted therefrom.

The present disclosure has been made in view of the circumstances as described above and aims at extracting a flicker component in one-pass from a frame for flicker correction and correcting the flicker component while reducing a necessary memory capacity as much as possible.

Solution to Problem

According to a first aspect of the present disclosure, there is provided an image processing apparatus including: a first row integration unit that integrates pixel values of a first exposure image for each row, to calculate a first row integration value for each row, the first exposure image being captured for a first exposure time by rolling shutter; a second row integration unit that integrates pixel values of a second exposure image for each row, to calculate a second row integration value for each row, the second exposure image having a subject and an angle of view common to the first exposure image and being captured for a second exposure time by rolling shutter, the second exposure time including a time period overlapping with the first exposure time; a row integration ratio calculation unit that divides the first row integration value by the second row integration value for each row, to calculate a row integration ratio; a reference value generation unit that generates a reference value for each row; a reference value integration unit that multiplies the integration ratio by the reference value for each row and integrates multiplication results respectively corresponding to all rows, to calculate a sum of the multiplication results from the integration ratio and the reference value; a flicker parameter estimation unit that estimates a flicker parameter of flicker generated in the first exposure image on the basis of the sum; and a flicker correction unit that corrects the flicker generated in the first exposure image on the basis of the estimated flicker parameter.

The second exposure time for which the second exposure image is captured can be an integral multiple of a period of flicker that may be generated in the first exposure image, the integral multiple of a period being a flickerless shutter time.

The row integration ratio calculation unit can divide the first row integration value, in which a difference in exposure time is adjusted for each row, by the second row integration value, to calculate a row integration ratio.

The flicker parameter estimation unit can estimate the flicker parameter of the flicker generated in the first exposure image on the basis of the sum by using a least-square method.

The flicker parameter estimation unit can estimate an amplitude and a phase as the flicker parameters on the basis of the sum when a component of the flicker generated in the first exposure image is approximated by a sine wave.

The image processing apparatus in the first aspect of the present disclosure can further include an integration weighting setting unit that sets an integration weighting factor by which the pixel value is multiplied when the pixel values are integrated for each row in each of the first row integration unit and the second row integration unit.

The reference value integration unit can multiply the integration ratio by the reference value for each row and multiplies each of the multiplication results respectively corresponding to all the rows by a weighting factor to be integrated, to calculate the sum of the multiplication results from the integration ratio and the reference value.

The first row integration unit, the second row integration unit, the row integration ratio calculation unit, the reference value generation unit, the reference value integration unit, the flicker parameter estimation unit, and the flicker correction unit can be provided for each color channel of the pixel values.

The image processing apparatus in the first aspect of the present disclosure can further include a luminance generation unit that generates a luminance from each color channel component of the pixel values, in which the first row integration unit, the second row integration unit, the row integration ratio calculation unit, the reference value generation unit, the reference value integration unit, and the flicker parameter estimation unit can regard the luminance as the pixel value, to estimate the flicker parameter based on the luminance, and the flicker correction unit can correct the flicker generated in the first exposure image for each color channel on the basis of the flicker parameter estimated on the basis of the luminance.

The image processing apparatus in the first aspect of the present disclosure can further include a detection area setting unit that sets detection areas for the first exposure image and the second exposure image, in which the first row integration unit, the second row integration unit, the row integration ratio calculation unit, the reference value generation unit, the reference value integration unit, and the flicker parameter estimation unit can execute respective processing for each of the detection areas, to estimate the flicker parameter for each of the detection areas.

The image processing apparatus in the first aspect of the present disclosure can further include a flicker intensity estimation unit that estimates a generation intensity distribution of the flicker on the basis of the estimated flicker parameter for each of the detection areas, in which the flicker correction unit can correct the flicker generated in the first exposure image also on the basis of the estimated generation intensity distribution of the flicker.

The image processing apparatus in the first aspect of the present disclosure can further include a whole flicker parameter estimation unit that estimates the flicker parameter of a whole image on the basis of the estimated flicker parameter for each of the detection areas, in which the flicker intensity estimation unit can estimate the generation intensity distribution of the flicker on the basis of the estimated flicker parameter for each of the detection areas and the flicker parameter of the whole image.

The flicker correction unit can correct the flicker generated in the first exposure image in a current frame on the basis of the flicker parameter estimated from the first exposure image and the second exposure image in the current frame.

The image processing apparatus in the first aspect of the present disclosure can further include a holding unit that holds the flicker parameter estimated from the first exposure image and the second exposure image in a frame previous to the current frame, in which the flicker correction unit can correct the flicker generated in the first exposure image in the current frame on the basis of the held flicker parameter.

The flicker correction unit can correct the flicker generated in the first exposure image in the current frame on the basis of the estimated flicker parameter and the second exposure image.

The image processing apparatus in the first aspect of the present disclosure can further include a flicker frequency estimation unit that estimates a period of the flicker generated in the first exposure image on the basis of a temporal or spatial transition of the estimated flicker parameter.

The detection area setting unit can set the detection areas for the first exposure image and the second exposure image on the basis of an estimated period of the flicker.

According to a first aspect of the present disclosure, there is provided an image processing method for an image processing apparatus, including the steps of: by the image processing apparatus, integrating pixel values of a first exposure image for each row, to calculate a first row integration value for each row, the first exposure image being captured for a first exposure time by rolling shutter; integrating pixel values of a second exposure image for each row, to calculate a second row integration value for each row, the second exposure image having a subject and an angle of view common to the first exposure image and being captured for a second exposure time by rolling shutter, the second exposure time including a time period overlapping with the first exposure time; dividing the first row integration value by the second row integration value for each row, to calculate a row integration ratio; generating a reference value for each row; multiplying the integration ratio by the reference value for each row and integrating multiplication results respectively corresponding to all rows, to calculate a sum of the multiplication results from the integration ratio and the reference value; estimating a flicker parameter of flicker generated in the first exposure image on the basis of the sum; and correcting the flicker generated in the first exposure image on the basis of the estimated flicker parameter.

According to a first aspect of the present disclosure, there is provided a program that causes a computer to function as: a first row integration unit that integrates pixel values of a first exposure image for each row, to calculate a first row integration value for each row, the first exposure image being captured for a first exposure time by rolling shutter; a second row integration unit that integrates pixel values of a second exposure image for each row, to calculate a second row integration value for each row, the second exposure image having a subject and an angle of view common to the first exposure image and being captured for a second exposure time by rolling shutter, the second exposure time including a time period overlapping with the first exposure time; a row integration ratio calculation unit that divides the first row integration value by the second row integration value for each row, to calculate a row integration ratio; a reference value generation unit that generates a reference value for each row; a reference value integration unit that multiplies the integration ratio by the reference value for each row and integrates multiplication results respectively corresponding to all rows, to calculate a sum of the multiplication results from the integration ratio and the reference value; a flicker parameter estimation unit that estimates a flicker parameter of flicker generated in the first exposure image on the basis of the sum; and a flicker correction unit that corrects the flicker generated in the first exposure image on the basis of the estimated flicker parameter.

In the first aspects of the present disclosure, pixel values of a first exposure image captured for a first exposure time by rolling shutter are integrated for each row to calculate a first row integration value for each row, and pixel values of a second exposure image captured for a second exposure time by rolling shutter are integrated for each row to calculate a second row integration value for each row, the second exposure image having a subject and an angle of view common to the first exposure image, the second exposure time including a time period overlapping with the first exposure time, and the first row integration value is divided by the second row integration value for each row, to calculate a row integration ratio. Further, a reference value is generated for each row, and the integration ratio is multiplied by the reference value for each row and multiplication results respectively corresponding to all rows are integrated, to calculate a sum of the multiplication results from the integration ratio and the reference value. Furthermore, a flicker parameter of flicker generated in the first exposure image is estimated on the basis of the sum, and the flicker generated in the first exposure image is corrected on the basis of the estimated flicker parameter.

According to a second aspect of the present disclosure, there is provided an image sensor including: a pixel unit; and an image processing unit, the pixel unit being capable of setting an exposure condition for each pixel and outputting a first exposure image and a second exposure image to the image processing unit, the first exposure image being obtained by reading pixels set to a first exposure time by rolling shutter, the second exposure image having a subject and an angle of view common to the first exposure image and being obtained by reading pixels set to a second exposure time by rolling shutter, the second exposure time including a time period overlapping with the first exposure time, the image processing unit including a first row integration unit that integrates pixel values of the first exposure image for each row, to calculate a first row integration value for each row, a second row integration unit that integrates pixel values of the second exposure image for each row, to calculate a second row integration value for each row, a row integration ratio calculation unit that divides the first row integration value by the second row integration value for each row, to calculate a row integration ratio, a reference value generation unit that generates a reference value for each row, a reference value integration unit that multiplies the integration ratio by the reference value for each row and integrates multiplication results respectively corresponding to all rows, to calculate a sum of the multiplication results from the integration ratio and the reference value, a flicker parameter estimation unit that estimates a flicker parameter of flicker generated in the first exposure image on the basis of the sum, and a flicker correction unit that corrects the flicker generated in the first exposure image on the basis of the estimated flicker parameter.

In the second aspect of the present disclosure, a first exposure image and a second exposure image are output to the image processing unit by the pixel unit, the first exposure image being obtained by reading pixels set to a first exposure time by rolling shutter, the second exposure image having a subject and an angle of view common to the first exposure image and being obtained by reading pixels set to a second exposure time by rolling shutter, the second exposure time including a time period overlapping with the first exposure time. Further, by the image processing unit, pixel values of the first exposure image are integrated for each row to calculate a first row integration value for each row, pixel values of the second exposure image are integrated for each row to calculate a second row integration value for each row, and the first row integration value is divided by the second row integration value for each row, to calculate a row integration ratio. Further, a reference value is generated for each row, and the integration ratio is multiplied by the reference value for each row and multiplication results respectively corresponding to all rows are integrated, to calculate a sum of the multiplication results from the integration ratio and the reference value. Furthermore, a flicker parameter of flicker generated in the first exposure image is estimated on the basis of the sum, and the flicker generated in the first exposure image is corrected on the basis of the estimated flicker parameter.

Advantageous Effects of Invention

According to the first and second aspects of the present disclosure, it is possible to extract a flicker component in one-pass from a frame for flicker correction and correct the flicker component while reducing a necessary memory capacity as much as possible.

MODE(S) FOR CARRYING OUT THE INVENTION

Hereinafter, the best mode for carrying out the present disclosure (hereinafter, described as embodiment) will be described in detail with reference to the drawings. Prior to the detailed description, the general outline of the present disclosure will be described.

<Regarding Image to be Processed>

In this embodiment, it is assumed that an SME (Spatially Multiplexed Exposure) image sensor is used. The SME image sensor can set different exposure conditions for each pixel.

Figure 1:
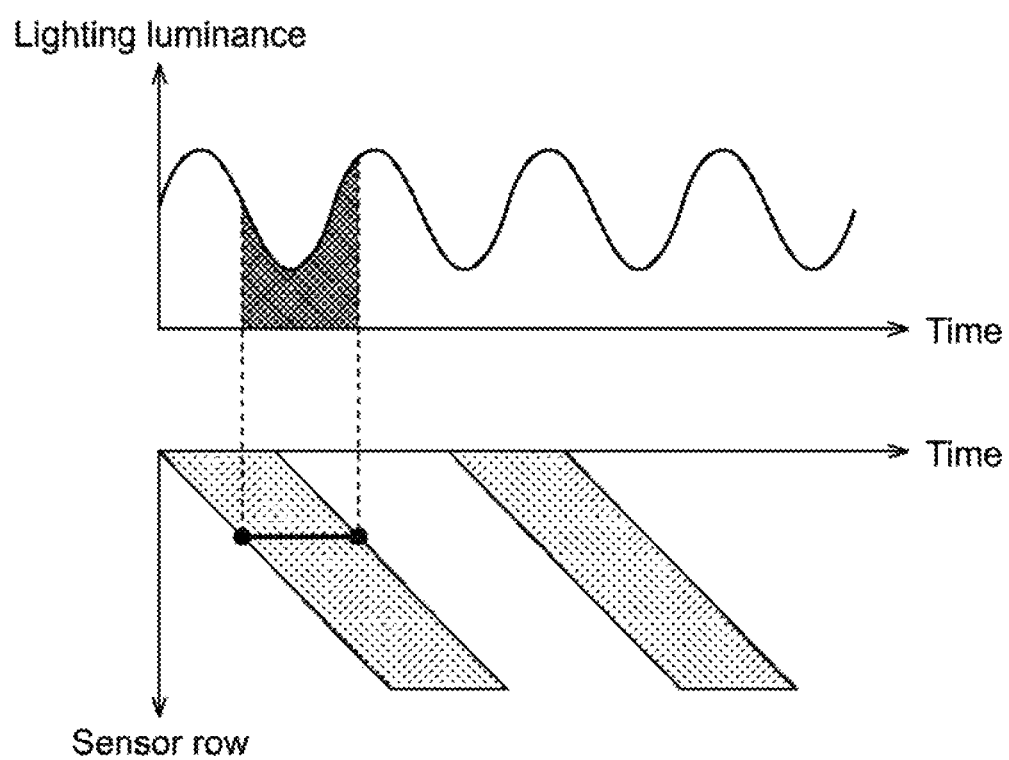
FIG. 1 is a diagram showing a relationship between fluctuations of a lighting luminance that periodically vary and an exposure time.
Figure 2:
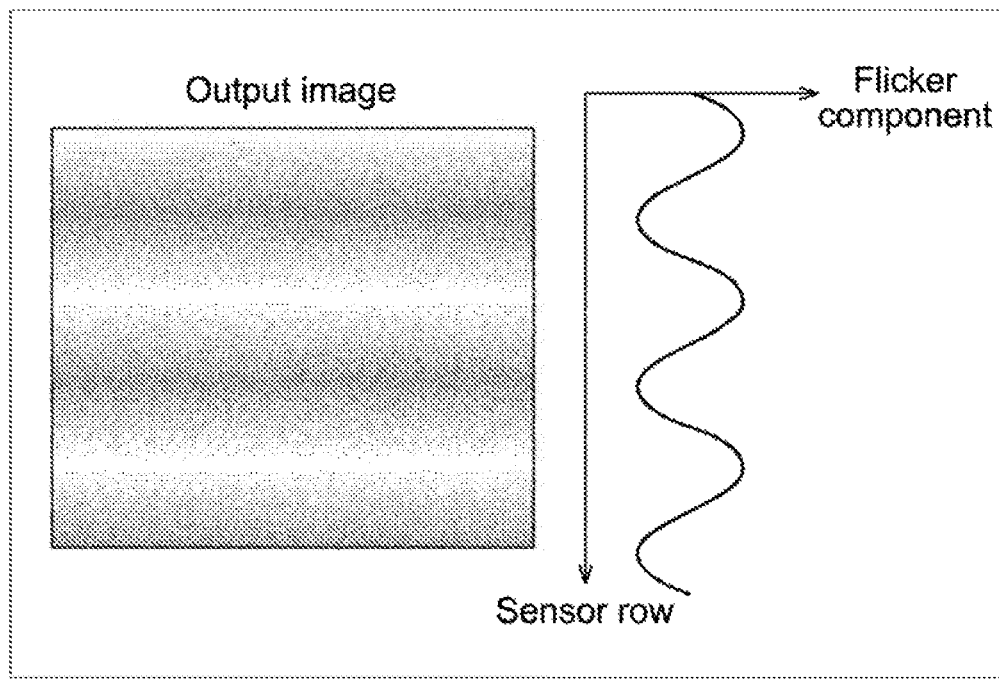
FIG. 2 is a diagram showing an example of a flicker phenomenon.
Figure 3:
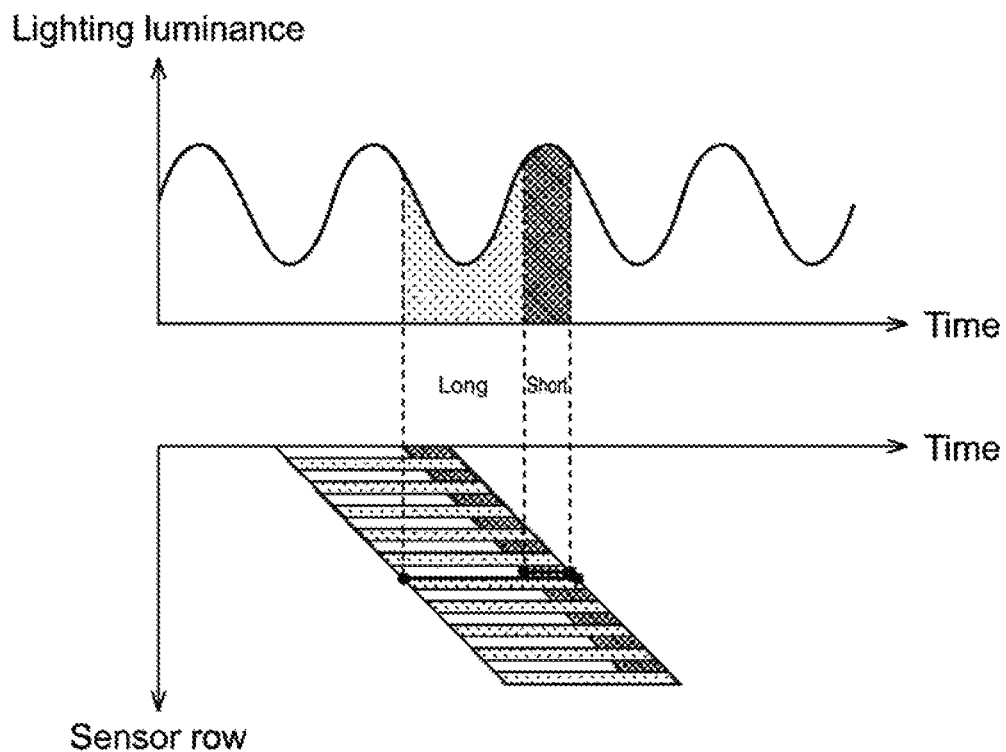
FIG. 3 is a diagram showing an imaging timing of a first exposure image and a second exposure image.

FIG. 3 shows an imaging timing by the SME image sensor. For example, of all the pixels disposed vertically and horizontally, a short exposure time can be set for the half of the pixels disposed in a checkered pattern, and a long exposure time can be set for the remaining half of the pixels. However, the short exposure time is assumed to be included in the long exposure time.

In other words, the SME image sensor can simultaneously capture a first exposure image formed of the pixels set to the short exposure time and a second exposure image formed of the pixels set to the long exposure time.

At that time, if the long exposure time is set to the integral multiple of a flicker period, a second exposure image in which flicker does not appear can be obtained. The long exposure time in this case is generally described as flickerless shutter time.

Hereinafter, this embodiment describes that the first exposure image of the short exposure time is a correction target, a flicker component is estimated using the first exposure image and the second exposure image, and a flicker phenomenon generated in the first exposure image is corrected on the basis of an estimation result. However, the first exposure image may be an image captured for an exposure time that is longer than a time including the long exposure time of the second exposure image (flickerless shutter time) and is not the integral multiple of the flicker period (not the flickerless shutter time).

<Model of Flicker Phenomenon>

In general, a flicker component indicating the level of flicker that can be generated in an image is known to be proportional to signal intensity of a subject. Thus, when a pixel at coordinates (x,y) is imaged for an exposure time s, a pixel value I (x,y) can be expressed by the following formula (1), using a time-varying component of a lighting luminance, $a_{ac} \cdot \sin(\omega t+\theta_{a\,c})$.

$$I(x,y)=\int_{ky-s}^{ky} \mathrm{img}(x,y) \cdot (1+a_{ac}\cdot\sin(\omega t+\theta_{ac}))dt \quad (1)$$

Here, img(x,y) is assumed as the original signal component of the subject per unit time, which is not affected by the flicker. Therefore, an ideal pixel value of the pixel at the coordinates (x,y), which is not affected by the flicker, is img(x,y)·s.

By the development of the formula (1), the following formula is obtained:

$$I(x,y)=\mathrm{img}(x,y) \cdot F(y)$$

where F(y) is as expressed by the following formula (2) and is an unknown sine function indicating the flicker component.

$$F(y) = s + \frac{2a_{ac}}{\omega} \cdot \sin\left(\frac{\omega s}{2}\right) \cdot \sin\left(\omega k y + \theta_{ac} - \frac{\omega s}{2}\right) \quad (2)$$

Conversely, if an amplitude a and a phase θ of the sine wave indicating the flicker component can be estimated apart from img(x,y) indicating a background component (scene that is hidden behind the flicker but is actually intended to be imaged), the flicker component that has appeared can be corrected.

Next, assuming that the exposure time of the first exposure image is $S_S$ and the exposure time of the second exposure image is $S_L$, a pixel value of the first exposure image at the coordinates (x,y) and a pixel value of the second exposure image at the coordinates (x,y) are respectively as follows:

$$I_S(x,y)=\mathrm{img}(x,y)\cdot(S_S+F_S(y)); \text{ and}$$

$$I_L(x,y)=\mathrm{img}(x,y)\cdot(S_L+F_L(y)).$$

However, from the formula (2), $F_S(y)$ and $F_L(y)$ are as expressed by the following formula (3).

$$F_S(y) = \frac{2a_{ac}}{\omega} \cdot \sin\left(\frac{\omega s_S}{2}\right) \cdot \sin\left(\omega k y + \theta_{ac} - \frac{\omega s_S}{2}\right), \quad (3)$$

$$F_L(y) = \frac{2a_{ac}}{\omega} \cdot \sin\left(\frac{\omega s_L}{2}\right) \cdot \sin\left(\omega k y + \theta_{ac} - \frac{\omega s_L}{2}\right)$$

Therefore, in the first exposure image and the second exposure image, integration values of the pixel values in each row are expressed by the formula (4).

$$\sum_x I_L(x, y) = (s_L + F_L(y)) \cdot \sum_x \mathrm{img}(x, y) \quad (4)$$

$$\sum_x I_S(x, y) = (s_S + F_S(y)) \cdot \sum_x \mathrm{img}(x, y)$$

Here, the exposure time $S_L$ of the second exposure image is the integral multiple of the flicker period. Since no flicker appears in the second exposure image, $F_L(y)=0$.

When a row integration ratio is calculated with an exposure ratio of the integration value of the pixel values in each row of the first exposure image to the integration value of the pixel values in each row of the second exposure image, the following formula (5) is obtained.

$$\frac{s_L \sum_x I_S(x, y)}{s_S \sum_x I_L(x, y)} = \frac{s_S + F_S(y)}{s_S} = \frac{F_S(y)}{s_S} + 1 \quad (5)$$

Since the formula (5) extracts the flicker component $F_S(y)$ to be separated from the background component img(x,y), when the observed row integration ratio is approximated by sine waves and the amplitude and phase thereof are estimated, the flicker component can be corrected. Additionally, since the formula (5) is $I_S(x,y)/img(x,y)·S_S$, which indicates a ratio of the pixel value of the first exposure image to an ideal pixel value, the reciprocal of the $F_S(y)$ approximated by sine waves can be used as it is as a correction coefficient in the y row of the first exposure image.

A calculated value of the row integration ratio indicating the observed waveform of the flicker component, ratio(y), is approximated by sine waves of the amplitude a and the phase θ. Specifically, the following formula (6) is used.

$$\hat{r} = a\sin(\omega y + \theta) + 1 \quad (6)$$

By the development and linearization of this formula, the following formula (7) is obtained.

$$\hat{r} = C\sin\omega y + S\cos\omega y + 1 \quad (7)$$

However, in the formula (7), the following definitions are provided: C=a cos θ; and S=a sin θ. Hereinafter, C and S are described as flicker parameters. The flicker parameters C and S are estimated using the least-square method.

Specifically, as expressed by the following formula (8), the flicker parameters C and S, by which an error squared term J of this approximation formula, the observed waveform, and an approximation formula thereof is minimized, are calculated.

$$J = \sum_y (\text{ratio}(y) - C\cdot\sin(\omega y) - S\cdot\cos(\omega y))^2 \quad (8)$$

It should be noted that the flicker parameters C and S by which the error squared term J is minimized satisfy the following formula (9).

$$\begin{cases} \frac{\partial J}{\partial C} = 2\sum_y (-\text{ratio}(y)\cdot\sin(\omega y) + C\cdot\sin^2(\omega y) + S\cdot\sin(\omega y)\cos(\omega y)) = 0 \\ \frac{\partial J}{\partial S} = 2\sum_y (-\text{ratio}(y)\cdot\cos(\omega y) + C\cdot\sin(\omega y)\cos(\omega y) + S\cdot\cos^2(\omega y)) = 0 \end{cases} \quad (9)$$

Therefore, the following formula (10) is obtained.

$$\begin{pmatrix} \sum\sin^2(\omega y) & \sum\sin(\omega y)\cos(\omega y) \\ \sum\sin(\omega y)\cos(\omega y) & \sum\cos^2(\omega y) \end{pmatrix} \cdot \begin{pmatrix} C \\ S \end{pmatrix} = \begin{pmatrix} \sum(\text{ratio}(y)-1)\cdot\sin(\omega y) \\ \sum(\text{ratio}(y)-1)\cdot\cos(\omega y) \end{pmatrix} \quad (10)$$

Additionally, since the formula (10) can be modified to the following formula (11), the flicker parameters C and S are calculated from the formula (11).

$$\begin{pmatrix} C \\ S \end{pmatrix} = \begin{pmatrix} \sum\sin^2(\omega y) & \sum\sin(\omega y)\cos(\omega y) \\ \sum\sin(\omega y)\cos(\omega y) & \sum\cos^2(\omega y) \end{pmatrix}^{-1} \cdot \begin{pmatrix} \sum(\text{ratio}(y)-1)\cdot\sin(\omega y) \\ \sum(\text{ratio}(y)-1)\cdot\cos(\omega y) \end{pmatrix} \quad (11)$$

If the waveform of the flicker component is restored from the flicker parameters C and S thus obtained, and each pixel of the first exposure image is multiplied by the reciprocal of the flicker intensity, a first exposure image in which the flicker phenomenon is corrected (hereinafter, described as flicker-corrected first exposure image) can be obtained.

<Configuration Example of Image Sensor as Embodiment of Present Disclosure>

Figure 4:
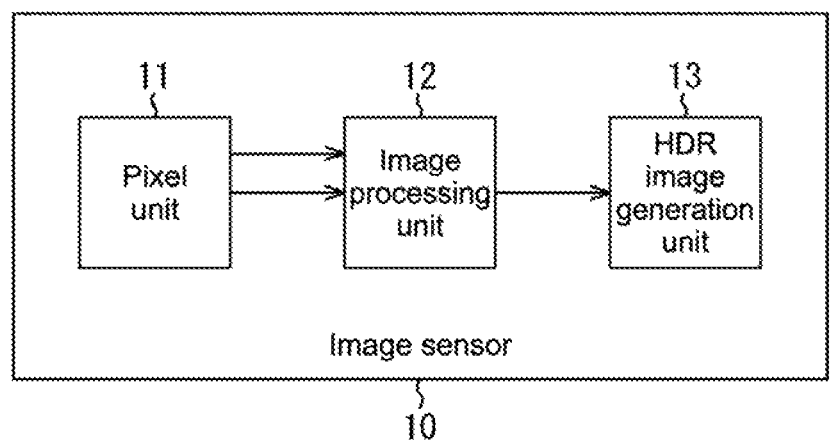
FIG. 4 is a block showing a configuration example of an image sensor to which the present disclosure is applied.

FIG. 4 shows a configuration example of an image sensor that is an embodiment of the present disclosure. An image sensor 10 is the Full-SME image sensor described above and includes a pixel unit 11, an image processing unit 12, and an HDR (High Dynamic Range) image generation unit 13.

The pixel unit 11 includes many pixels disposed vertically and horizontally and generates a pixel signal by optoelectronic conversion of each pixel. Specifically, a first exposure image, which is formed of pixels of a short exposure time, and a second exposure image, which is formed of pixels of a long exposure time that is the integral multiple of a flicker period, are captured by rolling shutter, and the respective pixel signals (pixel values) are output to the image processing unit 12 on a row to row basis.

The image processing unit 12 estimates a flicker component generated in the first exposure image on the basis of the first exposure image and the second exposure image that are simultaneously input from the pixel unit 11. The image processing unit 12 corrects the first exposure image on the basis of an estimation result, and outputs the resultant flicker-corrected first exposure image and the second exposure image for which correction is not necessary to the HDR image generation unit 13.

The HDR image generation unit 13 generates an HDR image on the basis of the flicker-corrected first exposure image and the second exposure image and then outputs the HDR image.

It should be noted that in this embodiment the image sensor 10 incorporates the image processing unit 12, but the image processing unit 12 may be provided independently of the image sensor. In other words, an image processing apparatus corresponding to the image processing unit 12 may process the first exposure image and the second exposure image that are output from the Full-SME image sensor. The HDR image generation unit 13 may also be provided independently of the image sensor.

<First Configuration Example of Image Processing Unit 12>

Figure 5:
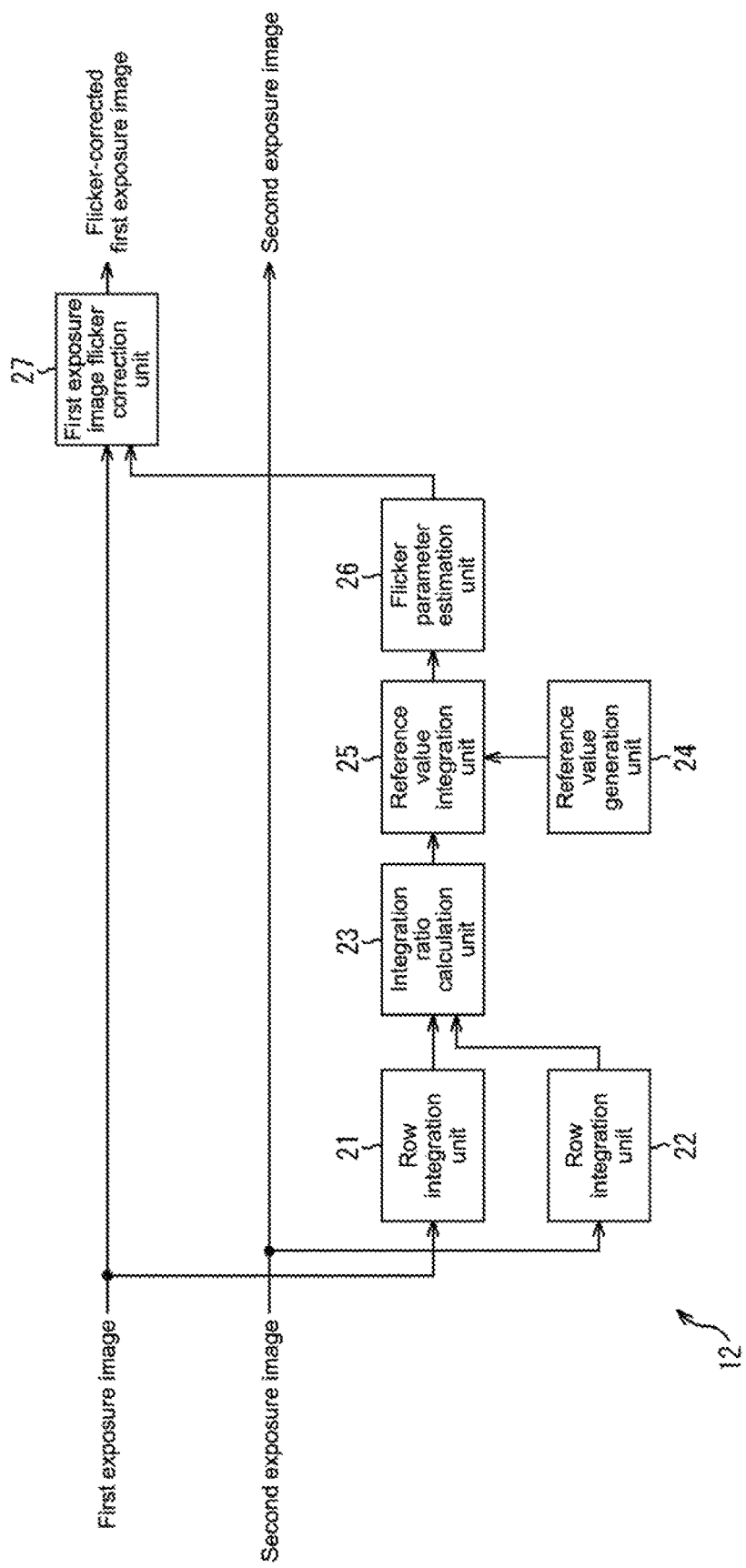
FIG. 5 is a block diagram of a first configuration example of an image processing unit.

FIG. 5 shows a configuration example (first configuration example) of the image processing unit 12.

The first configuration example includes row integration units 21 and 22, an integration ratio calculation unit 23, a reference value generation unit 24, a reference value integration unit 25, a flicker parameter estimation unit 26, and a first exposure image flicker correction unit 27.

The row integration unit 21 integrates the pixel values of the first exposure image for each row, the pixel values being input from the pixel unit 11 on a row by row basis, and outputs the resultant row integration value to the integration ratio calculation unit 23. Similarly, the row integration unit 22 integrates the pixel values of the second exposure image for each row, the pixel values being input from the pixel unit 11 on a row by row basis, and outputs the resultant row integration value to the integration ratio calculation unit 23.

Figure 6D:
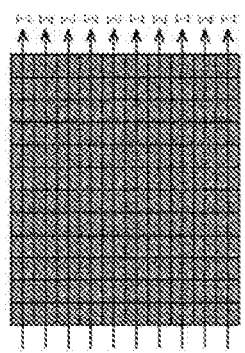
FIGS. 6A, 6B, 6C and 6D are a diagram showing examples of a method of integrating pixel values on a row by row basis by a row integration unit.
Figure 6C:
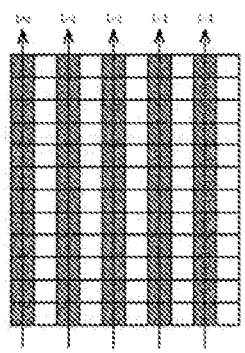
Figure 6B:
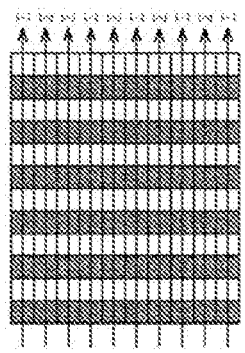
Figure 6A:
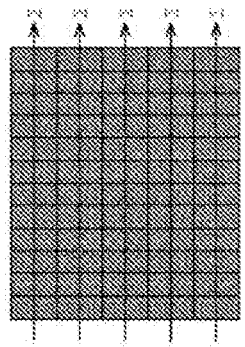

FIGS. 6A, 6B, 6C and 6D shows examples of a method of integrating the pixel values for each row in the row integration units 21 and 22. FIG. 6A shows a method of integrating all the pixel values in all the rows. FIG. 6B shows a modified example of thinning on a row by row basis. FIG. 6C shows a modified example of thinning and integration of the pixels in each row. FIG. 6D shows a modified example of integration of the pixel values for every several rows (for example, every two rows). The row integration units 21 and 22 can employ the modified examples shown in FIG. 6B to FIG. 6D and the like, in addition to the method shown in FIG. 6A.

Referring back to FIG. 5, the integration ratio calculation unit 23 divides the row integration value of the pixel values of the first exposure image, which is sequentially input from the row integration unit 21, by the row integration value of the pixel values of the second exposure image, which is sequentially input from the row integration unit 22. Thus, the integration ratio calculation unit 23 calculates a row integration ratio, i.e., an observed value ratio(y) of a flicker component for each row, to sequentially output the observed value ratio(y) to the reference value integration unit 25.

The reference value generation unit 24 generates reference values $\cos(\omega y)$ and $\sin(\omega y)$ for each row and outputs the reference values to the reference value integration unit 25. In the reference value integration unit 25, the observed value ratio(y) is multiplied by the reference values $\cos(\omega y)$ and $\sin(\omega y)$.

The reference value integration unit 25 multiplies the observed value ratio(y)−1, which is sequentially input from the integration ratio calculation unit 23, by each of the reference values $\cos(\omega y)$ and $\sin(\omega y)$, which are sequentially input from the reference value generation unit 24, and integrates the result and the results of the previous multiplication. Thus, the reference value integration unit 25 calculates the following elements of a 1-by-2 matrix on the right side of the right term of the formula (11):

$\Sigma(\text{ratio}(y)-1)\cdot\cos((\omega y));$ and $\Sigma(\text{ratio}(y)-1)\cdot\sin((\omega y)).$ The reference value integration unit 25 then outputs those elements to the flicker parameter estimation unit 26.

Figure 7:
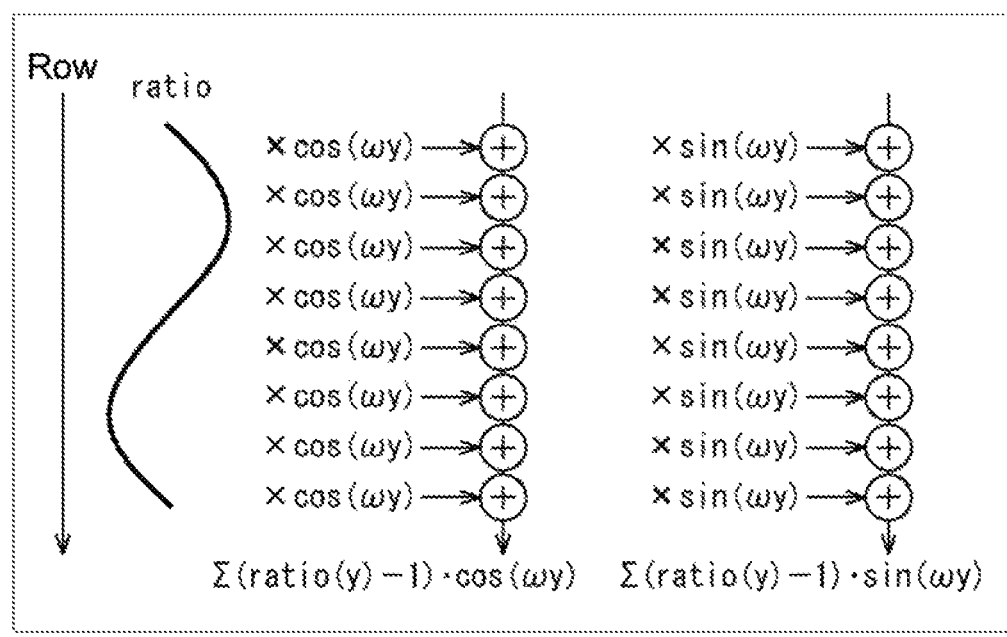
FIG. 7 is a diagram for describing calculation in a reference value integration unit.

FIG. 7 shows a state of calculation in the reference value integration unit 25.

As shown in the figure, each time the observed value ratio(y) is sequentially input, the reference value integration unit 25 multiplies the (ratio(y)−1) by each of the reference values $\cos(\omega y)$ and $\sin(\omega y)$, and integrates the multiplication results. Thus, the reference value integration unit 25 does not need memories for individually holding the multiplication results for each row, and may be provided with only a memory for holding integration results.

Referring back to FIG. 5, the flicker parameter estimation unit 26 applies the input from the reference value integration unit 25 to the formula (10), and thus calculates the flicker parameters C and S and outputs the flicker parameters C and S to the first exposure image flicker correction unit 27.

It should be noted that the row integration unit 21 to the reference value integration unit 25 can perform respective calculations in accordance with the scanning of the pixel unit 11. The flicker parameter estimation unit 26 can receive the output of the reference value integration unit 25 in accordance with the scanning of the last row. Therefore, the flicker parameter estimation unit 26 can calculate the final flicker parameters C and S for each frame in almost real time.

It should be noted that instead of the formula (11), the following formula (12) incorporating a weighting factor $w_y$ for each row may be employed.

$$\begin{pmatrix} C \\ S \end{pmatrix} = \begin{pmatrix} \sum W_y \cdot \sin^2(\omega y) & \sum W_y \sin(\omega y)\cos(\omega y) \\ \sum W_y \cdot \sin(\omega y)\cos(\omega y) & \sum W_y \cdot \cos^2(\omega y) \end{pmatrix}^{-1} \cdot \quad (12)$$

$$\begin{pmatrix} \sum W_y(\text{ratio}(y)-1)\cdot\sin(\omega y) \\ \sum W_y(\text{ratio}(y)-1)\cdot\cos(\omega y) \end{pmatrix}$$

In this case, in accordance with a pixel value distribution for each row, specifically, the number of pixels in which the pixel value for each row is saturated or the number of pixels that is considered as a dynamic body for each row, the reference value generation unit 24 sets the weighting factor $w_y$ for each row to be a smaller value as the number of pixels is larger.

The first exposure image flicker correction unit 27 restores the waveform of the flicker component from the flicker parameters C and S input from the flicker parameter estimation unit 26, and multiplies each pixel of the first exposure image by the reciprocal of the flicker intensity, to generate a flicker-corrected first exposure image in which the flicker generated in the first exposure image is corrected. It should be noted that the generated flicker-corrected first exposure image is output to the HDR image generation unit 13 of a subsequent stage from the image processing unit 12, together with the second exposure image for which correction is unnecessary.

<Description of Flicker Correction Processing>

Figure 8:
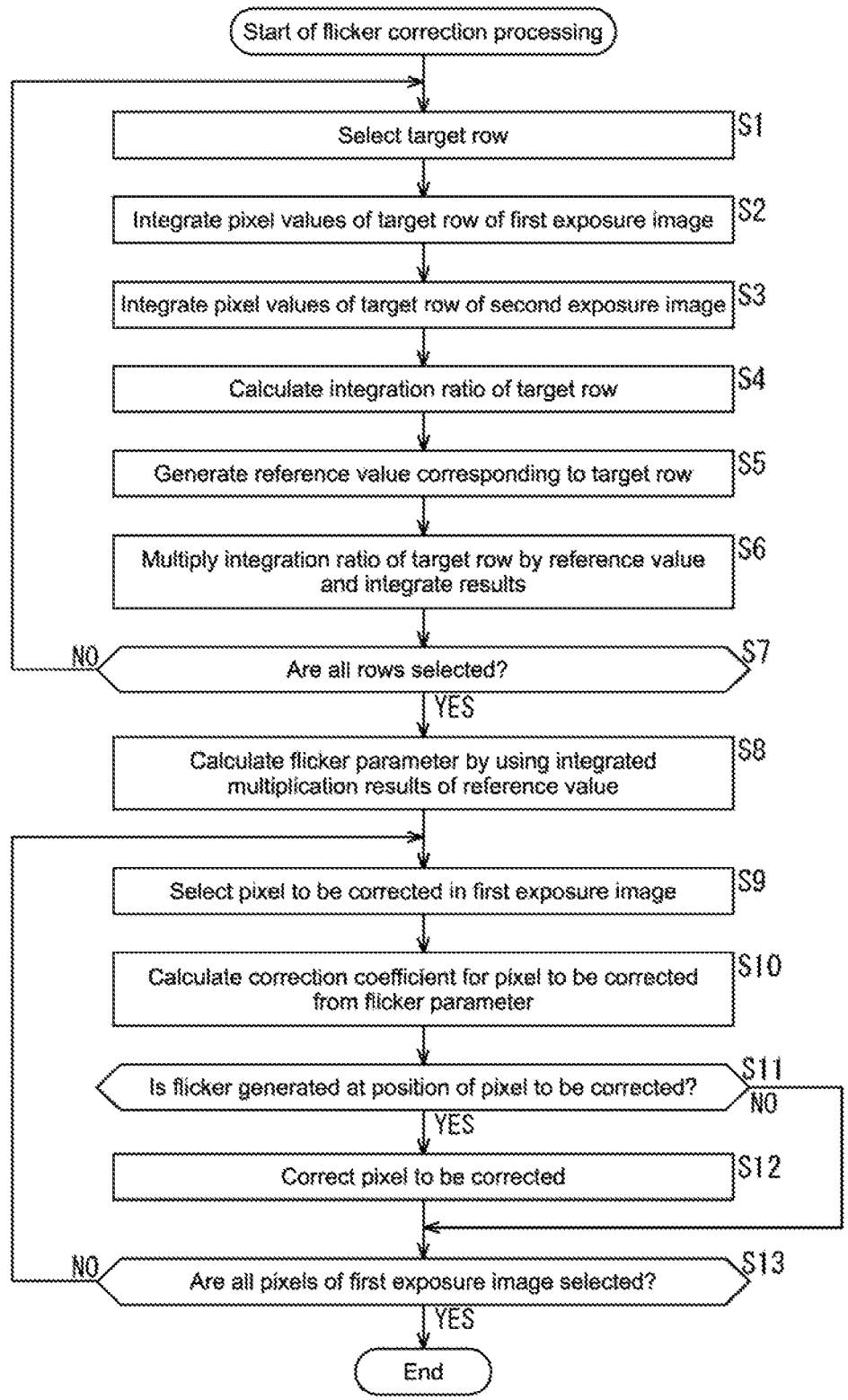
FIG. 8 is a flowchart for describing flicker correction processing by the image processing unit.

Next, FIG. 8 is a flowchart for describing flicker correction processing by the first configuration example of the image processing unit 12.

In Step S1, the image processing unit 12 sequentially selects all rows of the image as target rows for flicker correction. In Step S2, the image processing unit 12 outputs pixel values of pixels belonging to the first exposure image in a target row to the row integration unit 21. The row integration unit 21 integrates the pixel values of the first exposure image, which are input from the pixel unit 11 on a row by row basis, and outputs a resultant row integration value to the integration ratio calculation unit 23. Simultaneously with the processing of Step S2, in Step S3, the image processing unit 12 outputs pixel values of pixels belonging to the second exposure image in the target row to the row integration unit 22. The row integration unit 22 integrates the pixel values of the second exposure image, which are input from the pixel unit 11 on a row by row basis, and outputs a resultant row integration value to the integration ratio calculation unit 23.

In Step S4, the integration ratio calculation unit 23 divides the row integration value of the pixel values of the first exposure image, which is input from the row integration unit 21, by the row integration value of the pixel values of the second exposure image, which is input from the row integration unit 22. Thus, the integration ratio calculation unit 23 calculates a row integration ratio of the target row, i.e., an observed value ratio(y) of the flicker component, and outputs the observed value ratio(y) to the reference value integration unit 25.

In Step S5, the reference value generation unit 24 generates the reference values cos(ωy) and sin(ωy) corresponding to the target row and outputs the reference values cos(ωy) and sin(ωy) to the reference value integration unit 25. In Step S6, the reference value integration unit 25 multiplies the observed value ratio(y)−1 by each of the reference values cos(ωy) and sin(ωy), the observed value ratio(y)−1 being input from the integration ratio calculation unit 23, the reference values cos(ωy) and sin(ωy) being input from the reference value generation unit 24, and then integrates those results and the results of the previous multiplication.

In Step S7, the image processing unit 12 determines whether all the rows of the image are selected as target rows. When there is a row that is not selected, the processing is returned to Step S1 and repeated from Step S1. When there is no row that is not selected, i.e., when all the rows are selected as target rows, the processing proceeds to Step S8.

In Step S8, the reference value integration unit 25 outputs Σ(ratio(y)−1)·cos(ωy) and Σ(ratio(y)−1)·sin(ωy), which are integrated by then, to the flicker parameter estimation unit 26. The flicker parameter estimation unit 26 applies the input from the reference value integration unit 25 to the formula (10), and thus estimates the flicker parameters C and S and outputs the flicker parameters C and S to the first exposure image flicker correction unit 27.

In Step S9, the first exposure image flicker correction unit 27 selects all the pixels of the first exposure image one by one as a pixel to be corrected. In Step S10, the first exposure image flicker correction unit 27 restores the waveform of the flicker component from the flicker parameters C and S input from the flicker parameter estimation unit 26, and calculates, as a correction coefficient, the reciprocal of the flicker intensity of the row to which the pixel to be corrected belongs.

In Step S11, the first exposure image flicker correction unit 27 determines whether a flicker phenomenon is generated at the position of the pixel to be corrected. When a flicker phenomenon is generated, for Step S12, the first exposure image flicker correction unit 27 multiplies the pixel value of the pixel to be corrected by the correction coefficient, to generate a pixel value of a flicker-corrected first exposure image. When a flicker phenomenon is not generated, Step S12 is skipped.

In Step S13, the first exposure image flicker correction unit 27 determines whether all the pixels of the first exposure image are selected as pixels to be corrected. When there is a pixel that is not selected, the processing is returned to Step S9 and repeated from Step S9. When there is no pixel that is not selected, i.e., when all the pixels of the first exposure image are selected as pixels to be corrected, the flicker correction processing is terminated.

It should be noted that the generated flicker-corrected first exposure image is output to the HDR image generation unit 13 of a subsequent stage from the image processing unit 12, together with the second exposure image for which correction is unnecessary. The description of the flicker correction processing by the first configuration example of the image processing unit 12 is thus terminated.

<Second Configuration Example of Image Processing Unit 12>

Figure 9:
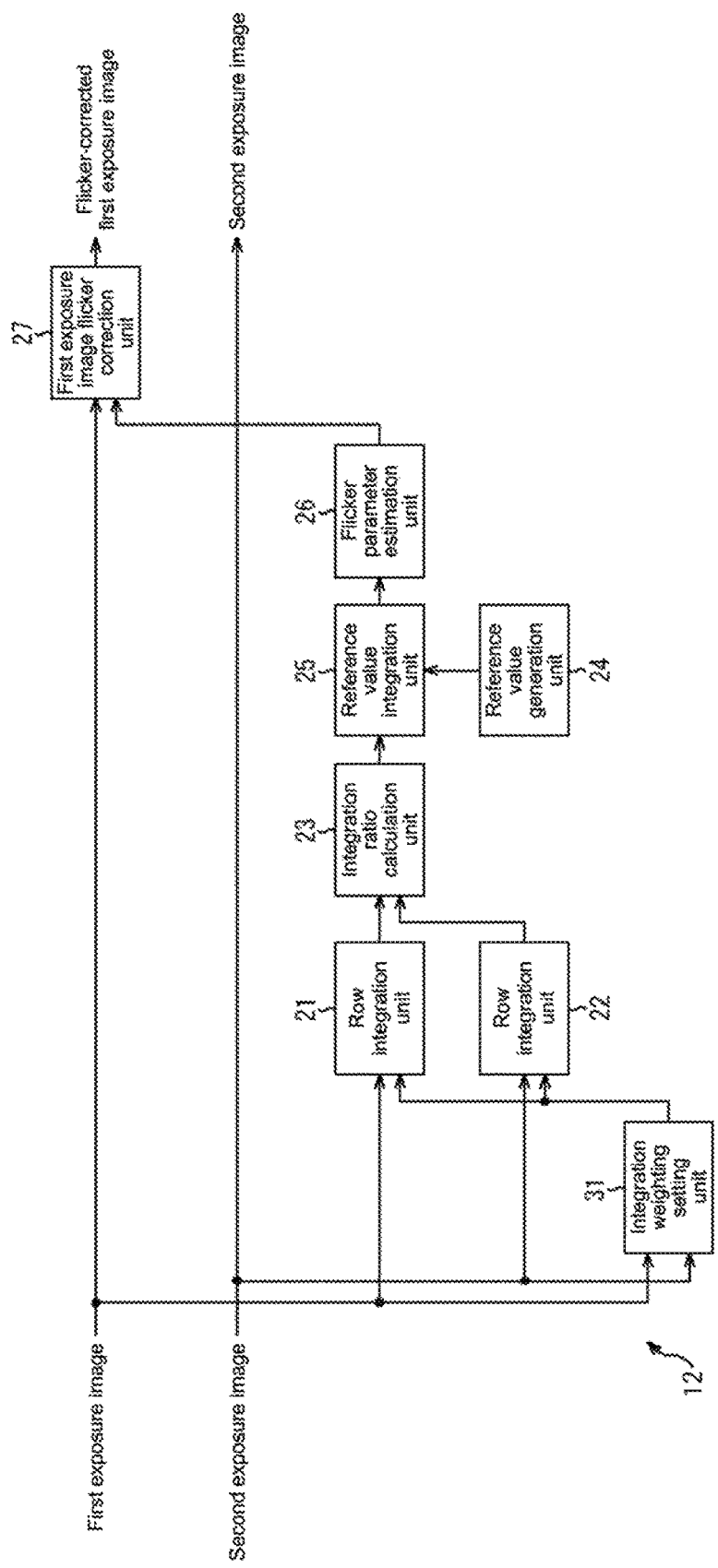
FIG. 9 is a block diagram of a second configuration example of the image processing unit.

Next, FIG. 9 shows another configuration example (second configuration example) of the image processing unit 12.

The second configuration example is provided by adding an integration weighting setting unit 31 to the first configuration example shown in FIG. 5. Constituent elements common to those of the first configuration example are denoted by the same reference symbols, and description thereof will thus be omitted as appropriate.

The integration weighting setting unit 31 sets a factor, which is used for integrating the pixel values for each row in the row integration units 21 and 22 (hereinafter, referred to as integration weighting factor), to a value in the range from 0.0 to 1.0.

Figure 10A:
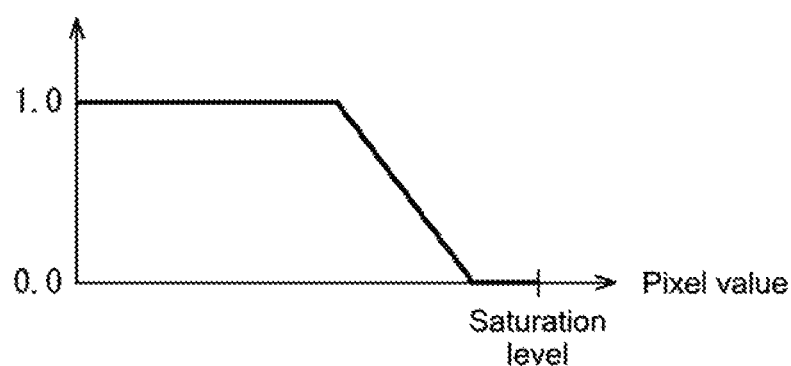
FIGS. 10A and 10B are a diagram showing an example of a method of setting an integration weighting factor.
Figure 10B:
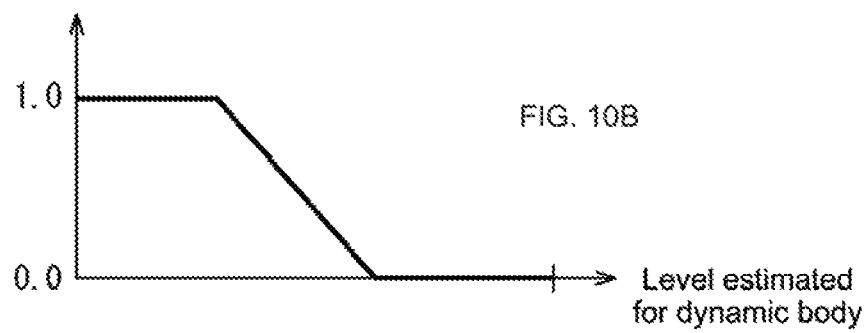

FIGS. 10A and 10B shows an example of a method of setting the integration weighting factor. For example, as shown in part FIG. 10A, the integration weighting setting unit 31 sets the integration weighting factor to a smaller value as the pixel value approaches a saturation level. When the pixel value reaches the saturation level, the integration weighting setting unit 31 sets the integration weighting factor to 0 such that the pixel value is not substantially integrated.

Further, for example, as shown in FIG. 10B, the integration weighting setting unit 31 determines whether a subject is moving or not at the position of each pixel, and sets the integration weighting factor to a smaller value as a moving amount thereof increases. When the movement of the subject reaches a level considered as a dynamic body, the integration weighting setting unit 31 sets the integration weighting factor to 0 such that the pixel value is not substantially integrated.

It should be noted that any one of the methods of setting the integration weighting factor shown in FIGS. 10A and 10B may be employed, or both the methods may be employed in combination.

<Third Configuration Example of Image Processing Unit 12>

Figure 11:
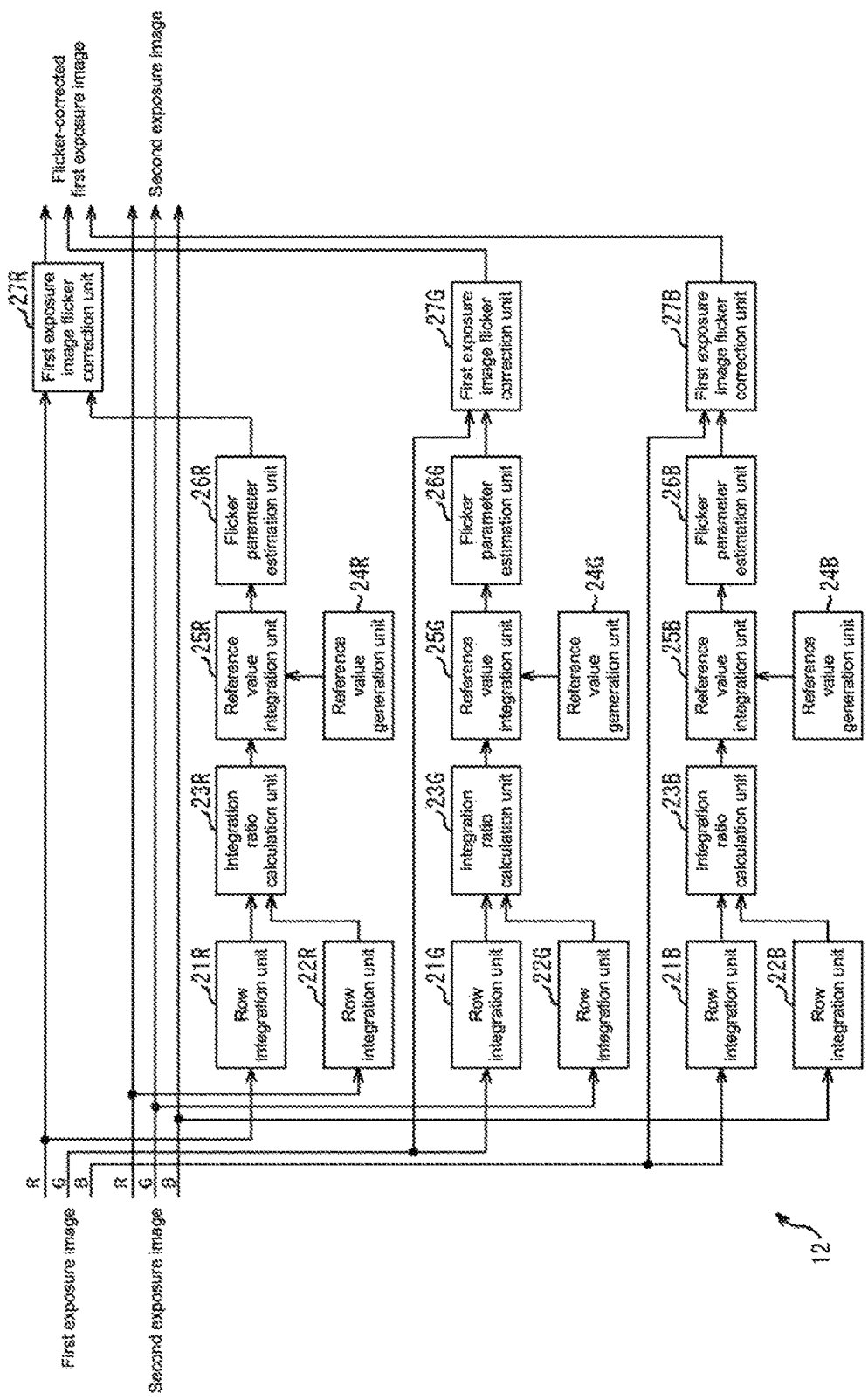
FIG. 11 is a block diagram of a third configuration example of the image processing unit.

FIG. 11 shows another configuration example (third configuration example) of the image processing unit 12.

The third configuration example is a configuration example corresponding to a case where the first exposure image and the second exposure image, which are output to the image processing unit 12 by the pixel unit 11, are raw data. A configuration similar to the first configuration example shown in FIG. 5 is provided to correspond to each of color channels (in this figure, R, G, and B). It should be noted that constituent elements common to those of the first configuration example are denoted by the same reference symbols with any of R, G, and B, and description thereof will thus be omitted as appropriate.

According to the third configuration example, a flicker-corrected first exposure image can be obtained for each color channel.

<Fourth Configuration Example of Image Processing Unit 12>

Figure 12:
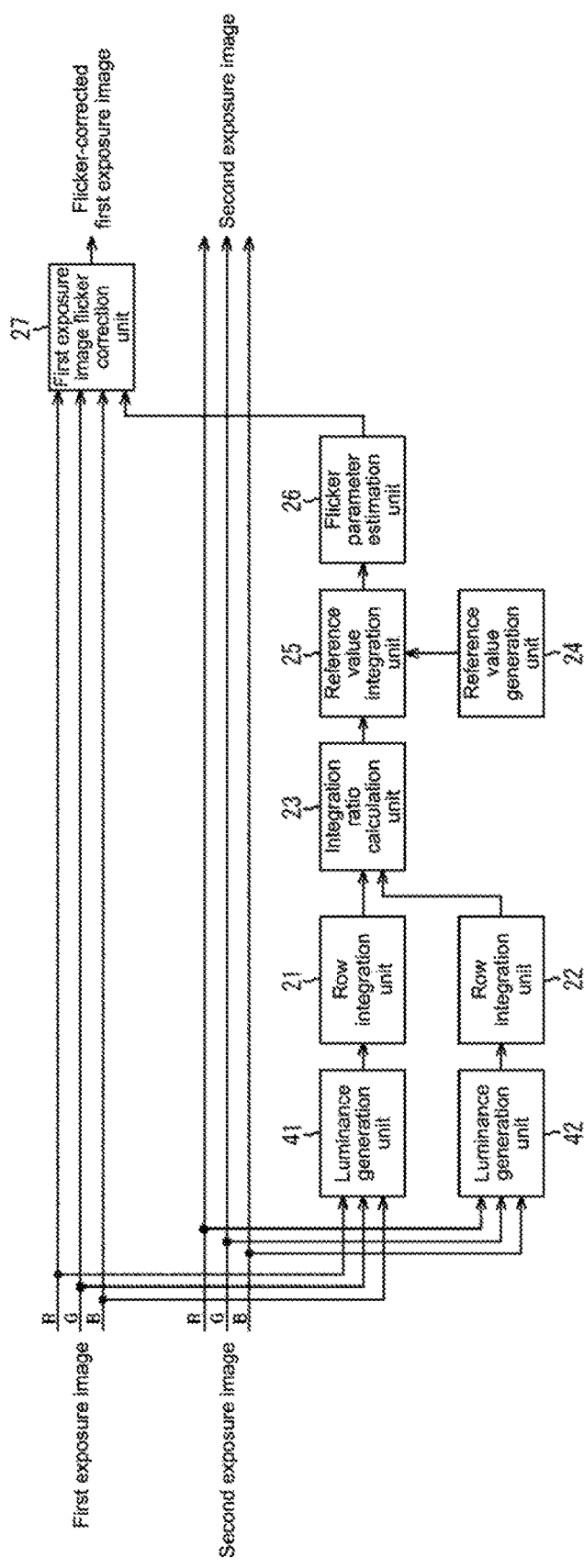
FIG. 12 is a block diagram of a fourth configuration example of the image processing unit.

FIG. 12 shows still another configuration example (fourth configuration example) of the image processing unit 12.

The fourth configuration example is a configuration example corresponding to a case where the first exposure image and the second exposure image, which are output to the image processing unit 12 by the pixel unit 11, are raw data, and is provided by adding luminance generation units 41 and 42 to the first configuration example shown in FIG. 5. It should be noted that constituent elements common to those of the first configuration example are denoted by the same reference symbols, and description thereof will thus be omitted as appropriate.

The luminance generation unit 41 generates a luminance from the raw data of a pixel of the first exposure image, which is input from the pixel unit 11 on a row by row basis, and outputs the luminance to the row integration unit 21. Similarly, the luminance generation unit 42 generates a luminance from the raw data of a pixel of the second exposure image, which is input from the pixel unit 11 on a row by row basis, and outputs the luminance to the row integration unit 22. As a result, a parameter based on the luminance is estimated from the flicker parameter estimation unit 26, and flicker correction is performed for each color channel in the first exposure image flicker correction unit 27.

According to the fourth configuration example, a flicker-corrected first exposure image that is corrected for each color channel can be obtained on the basis of the flicker parameter estimated from the luminance.

<Fifth Configuration Example of Image Processing Unit 12>

Figure 13:
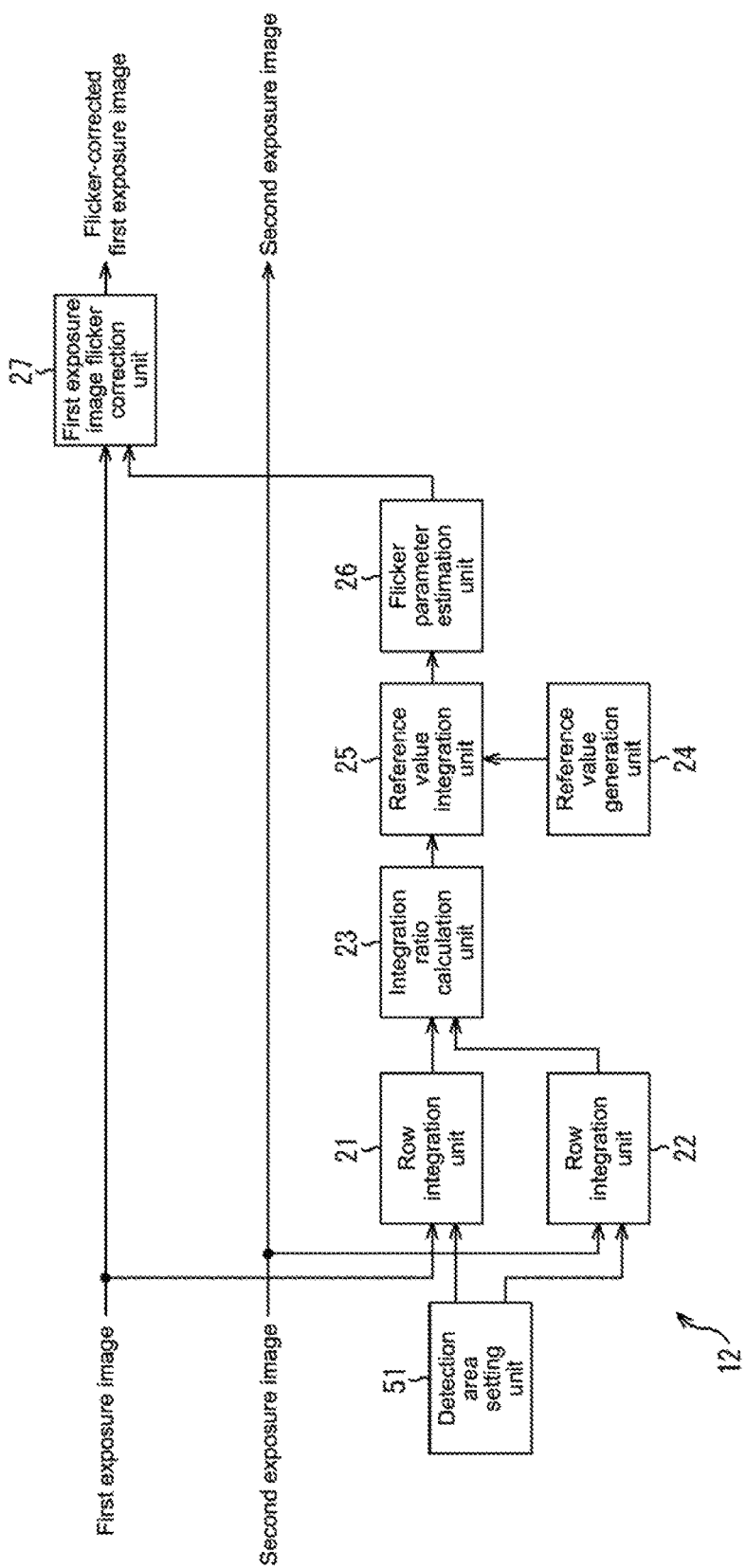
FIG. 13 is a block diagram of a fifth configuration example of the image processing unit.

FIG. 13 shows still another configuration example (fifth configuration example) of the image processing unit 12.

The fifth configuration example is provided by adding a detection area setting unit 51 to the first configuration example shown in FIG. 5. Constituent elements common to those of the first configuration example are denoted by the same reference symbols, and description thereof will thus be omitted as appropriate.

Figure 14A:
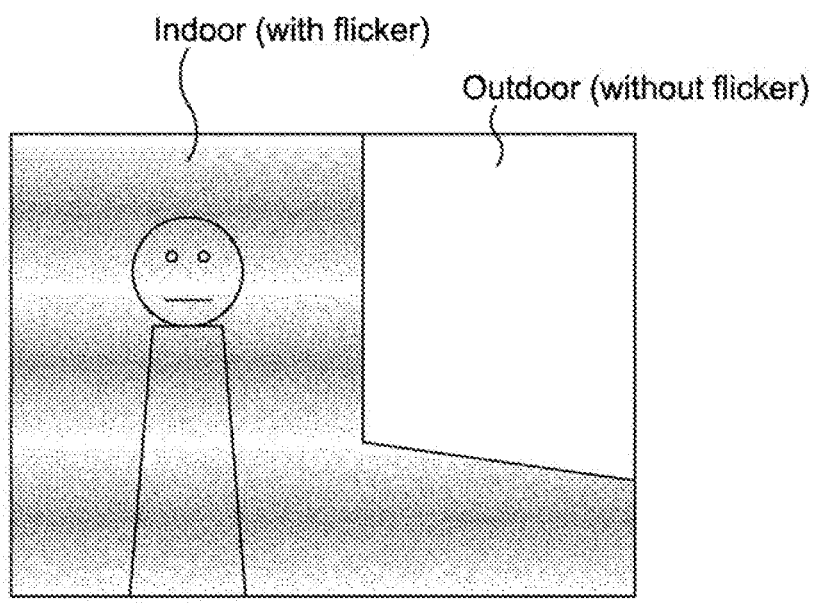
FIGS. 14A and 14B are a diagram showing an example of a detection area.
Figure 14B:
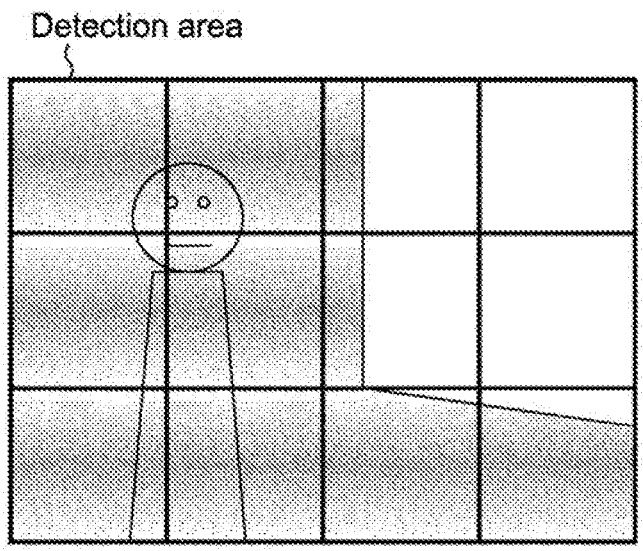

For example, as shown in FIGS. 14A and 14B, the detection area setting unit 51 segments the image into a plurality of areas (detection areas) and notifies the row integration units 21 and 22 of a segmentation result. After the row integration units 21 and 22, the flicker correction processing can be performed for each segmented detection area.

The size of the detection area by the detection area setting unit 51, the number of segments, and the like are arbitrarily set. When the detection areas are segmented in accordance with a flicker period or a luminance distribution, the flicker parameters for each detection area that are effective for the flicker correction can be estimated.

Figure 15C:
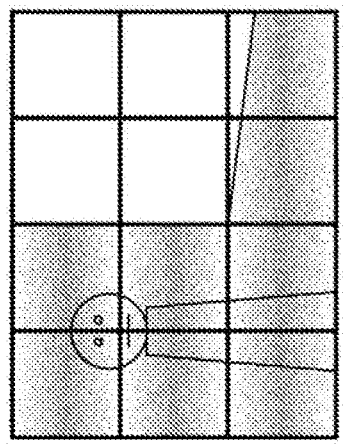
FIGS. 15A, 15B and 15C are a diagram for describing a segmentation method for detection areas.
Figure 15B:
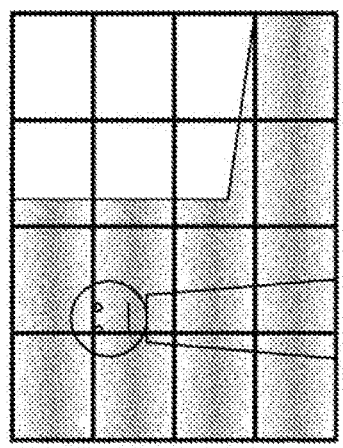
Figure 15A:
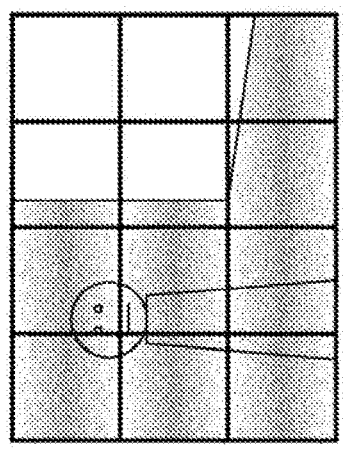

FIGS. 15A, 15B and 15C are a diagram for describing the segmentation method for the detection areas by the detection area setting unit 51. FIGS. 15A and 15B are examples in which the height of the detection area is provided in accordance with the flicker period. In other words, in the cases of FIGS. 15A and 15B, the limits of the detection areas are matched with bright portions caused by the flicker phenomenon. The height of the detection area is the integral multiple of the flicker period. FIG. 15C is an example in which the limits of the detection areas are matched with edges of luminance on the basis of the luminance distribution of the whole image.

It should be noted that the flicker period is assumable on the basis of the frequency of an AC power supply that drives a lighting (for example, 50 Hz etc.) and imaging settings of the image sensor 10.

According to the fifth configuration example, a flicker-corrected first exposure image that is corrected for each detection area can be obtained. However, as shown in FIGS. 14A and 14B, when the image includes areas that are not affected by the lighting driven by the AC power supply and does not cause the flicker phenomenon, the effect of the flicker correction may not be obtained in detection areas including those areas. A configuration example in which such inconvenience can be solved will be described below.

<Sixth Configuration Example of Image Processing Unit 12>

Figure 16:
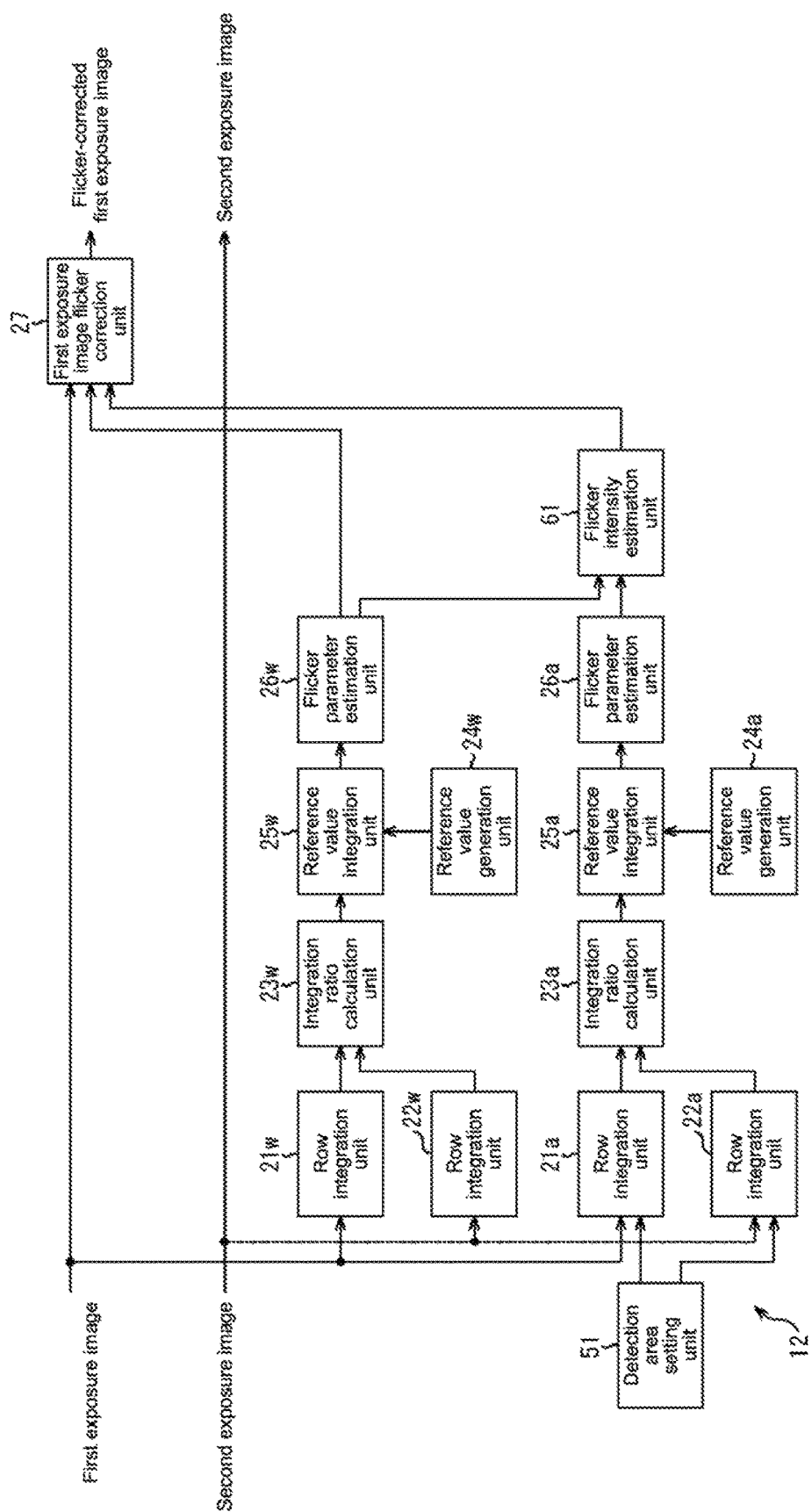
FIG. 16 is a block diagram of a sixth configuration example of the image processing unit.

FIG. 16 shows still another configuration example (sixth configuration example) of the image processing unit 12.

The sixth configuration example is provided by combining the first configuration example of FIG. 5 (the row integration unit 21 to the flicker parameter estimation unit 26 and the first exposure image flicker correction unit 27) with the fifth configuration example of FIG. 13 (the row integration unit 21 to the flicker parameter estimation unit 26 and the detection area setting unit 51), and by further adding a flicker intensity estimation unit 61 thereto.

Figure 17C:
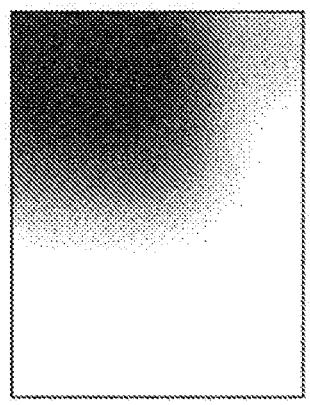
FIGS. 17A, 17B and 17C are a diagram showing examples of a flicker intensity distribution.
Figure 17B:
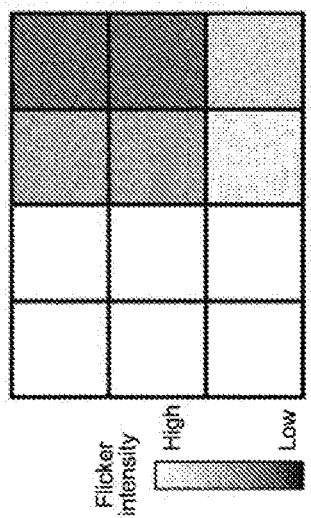
Figure 17A:
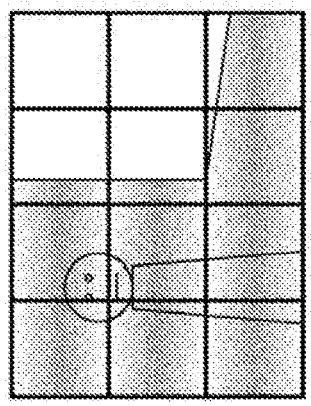

The flicker intensity estimation unit 61 estimates a flicker generation intensity distribution as shown in FIG. 17C on the basis of flicker parameters estimated from the whole image and flicker parameters estimated for each detection area as shown in FIG. 17B. Additionally, on the basis of the estimated flicker generation intensity distribution, the flicker intensity estimation unit 61 sets an application intensity of the correction coefficient by which the pixel value of the first exposure image is multiplied in the first exposure image flicker correction unit 27, and notifies the first exposure image flicker correction unit 27 of the application intensity.

The estimation of the flicker generation intensity distribution will be described. Hereinafter, flicker parameters estimated from the whole image are denoted by $C_w$ and $S_w$. Further, flicker parameters estimated for a detection area i are denoted by $C_{a\,i}$ and $S_{a\,i}$.

Figure 18:
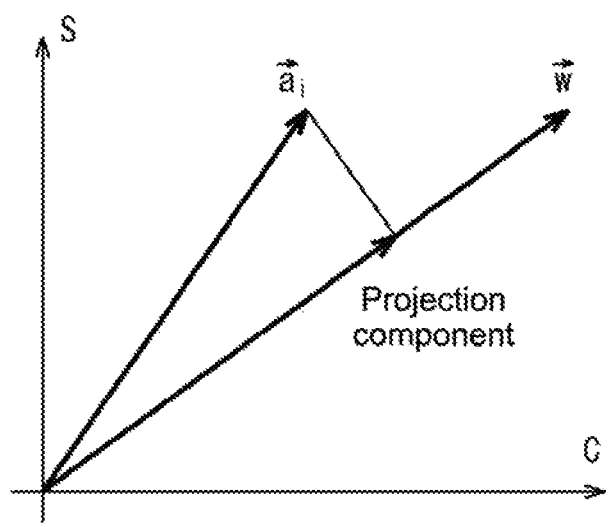
FIG. 18 is a diagram showing an example of the flicker intensity distribution.

The flicker intensity estimation unit 61 calculates an amplitude ratio $SQR(C_w^2+S_w^2):SQR(C_{a\,i}^2+S_{a\,i}^2)$. Alternatively, the flicker intensity estimation unit 61 sets the flicker parameters estimated from the whole image to be a vector $w=(C_w,S_w)$ and the flicker parameters estimated for the detection area i to be a vector $ai=(C_{a\,i},S_{a\,i})$ and, as shown in FIG. 18, calculates the intensity of the detection area i to the whole image by $ai \cdot w/|w|$, to serve as a component of the vector ai that is matched with the vector w in phase (projection component). Thus, an amplitude ratio of the vector w and the vector ai is calculated. Additionally, a flicker intensity of each detection area is calculated on the basis of the amplitude ratio and interpolated by a predetermined interpolation technique, to estimate a flicker generation intensity distribution.

According to the sixth configuration example, a flicker-corrected first exposure image corrected in accordance with the flicker generation intensity distribution in the whole image can be obtained.

<Seventh Configuration Example of Image Processing Unit 12>

Figure 19:
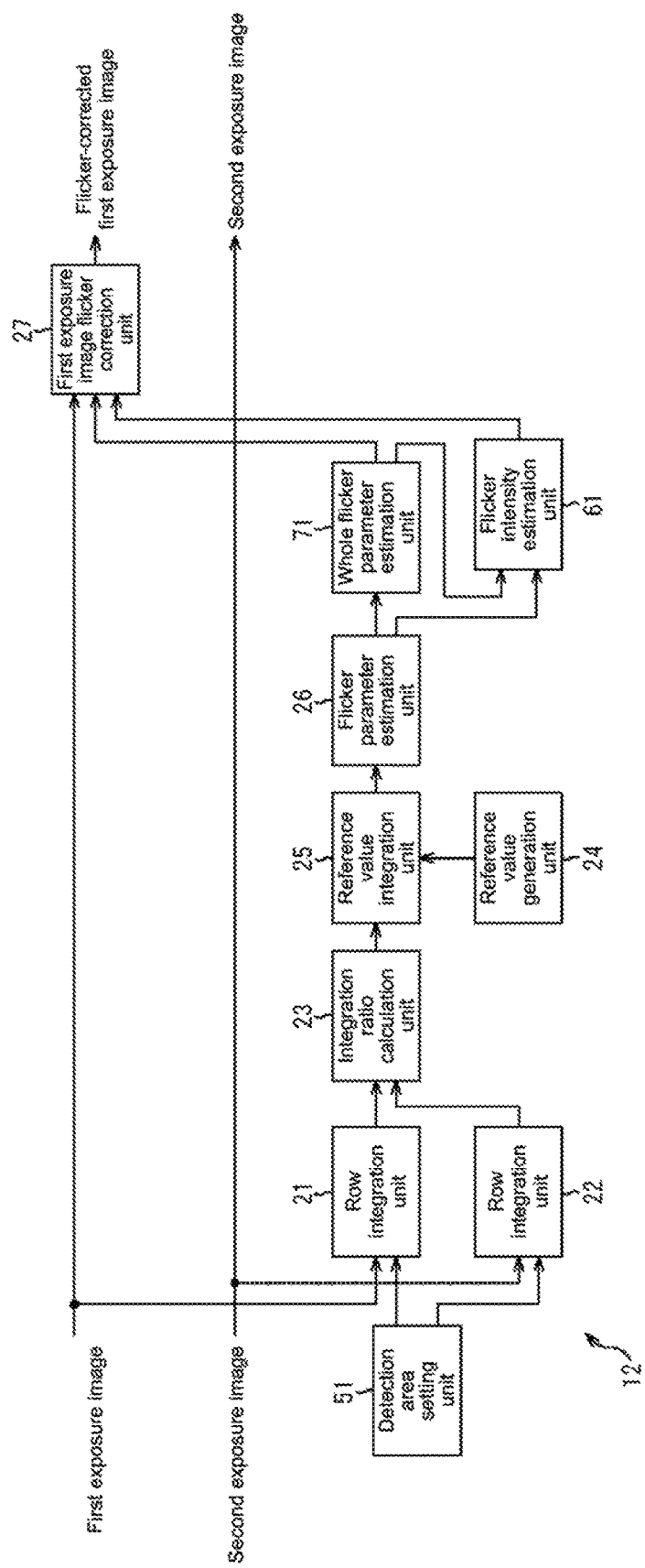
FIG. 19 is a block diagram of a seventh configuration example of the image processing unit.

FIG. 19 shows still another configuration example (seventh configuration example) of the image processing unit 12.

The seventh configuration example is provided by adding a flicker intensity estimation unit 61 and a whole flicker parameter estimation unit 71 to the fifth configuration example shown in FIG. 13. The flicker intensity estimation unit 61 is similar to that of the sixth configuration example.

The whole flicker parameter estimation unit 71 estimates the flicker parameters $C_w$ and $S_w$ of the whole image on the basis of the flicker parameters $C_{a\,i}$ and $S_{a\,i}$ estimated for each detection area in the flicker parameter designation unit 26.

Specifically, average values of the flicker parameters $C_{a\,i}$ and $S_{a\,i}$ estimated for each detection area are employed as the flicker parameters $C_w$ and $S_w$ of the whole image, or weighted average values of the flicker parameters $C_{a\,i}$ and $S_{a\,i}$ estimated for each detection area are employed as the flicker parameters $C_w$ and $S_w$ of the whole image. In the weighted average, for example, the weight of a detection area having small flicker intensity is set to be small. Further, for example, the weight is set to be larger as the number of pixels whose pixel values in each detection area are not saturated and actually integrated is larger. It should be noted that the weighting standard is not limited to those examples.

The flicker intensity estimation unit 72 estimates a flicker generation intensity distribution as shown in FIG. 17C on the basis of the estimated flicker parameters $C_w$ and $S_w$ of the whole image and the flicker parameters $C_{a\,i}$ and $S_{a\,i}$ estimated for each detection area. Additionally, on the basis of the estimated flicker generation intensity distribution, the flicker intensity estimation unit 61 sets an application intensity of the correction coefficient by which the pixel value of the first exposure image is multiplied in the first exposure image flicker correction unit 27, and notifies the first exposure image flicker correction unit 27 of the application intensity.

<Regarding Flicker Correction Processing by Seventh Configuration Example of Image Processing Unit 12>

Flicker correction processing by the seventh configuration example serving as a representative configuration example including the detection area setting unit 51 will be described.

Figure 20:
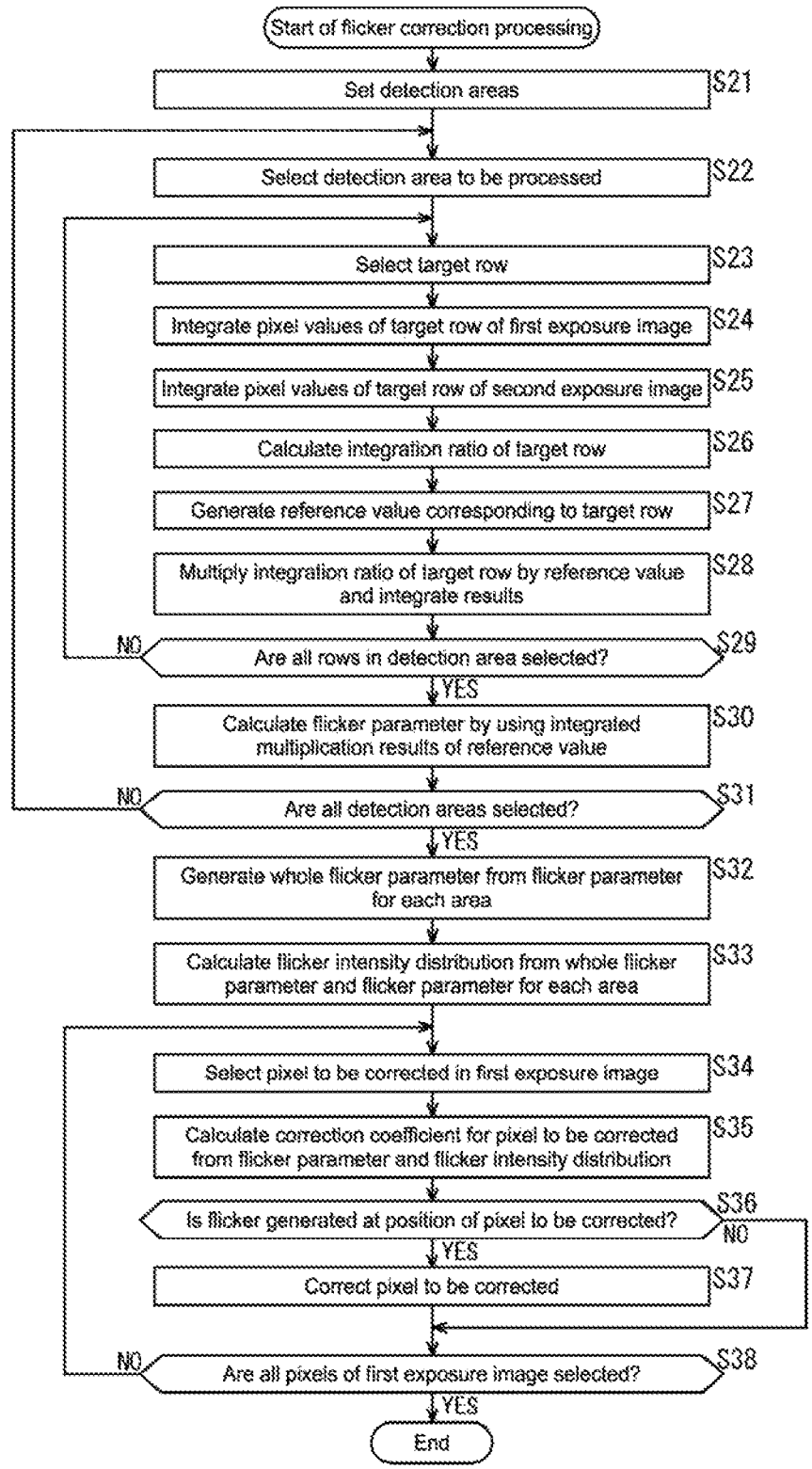
FIG. 20 is a flowchart for describing flicker correction processing by the image processing unit.

FIG. 20 is a flowchart for describing flicker correction processing by the seventh configuration example.

In Step S21, the detection area setting unit 51 segments an image into a plurality of detection areas. In Step S22, the detection area setting unit 51 sequentially selects all the detection areas as areas to be processed.

In Step S23, the image processing unit 12 sequentially selects all rows of the detection areas to be processed as target rows for flicker correction. In Step S24, the image processing unit 12 outputs pixel values of pixels belonging to the first exposure image in a target row to the row integration unit 21. The row integration unit 21 integrates the pixel values of the first exposure image, which are input from the pixel unit 11 on a row by row basis, and outputs a resultant row integration value to the integration ratio calculation unit 23. Simultaneously with the processing of Step S24, in Step S25, the image processing unit 12 outputs pixel values of pixels belonging to the second exposure image in a target row to the row integration unit 22. The row integration unit 22 integrates the pixel values of the second exposure image, which are input from the pixel unit 11 on a row by row basis, and outputs a resultant row integration value to the integration ratio calculation unit 23.

In Step S26, the integration ratio calculation unit 23 divides the row integration value of the pixel values of the first exposure image, which is input from the row integration unit 21, by the row integration value of the pixel values of the second exposure image, which is input from the row integration unit 22. Thus, the integration ratio calculation unit 23 calculates a row integration ratio of the target row, i.e., an observed value ratio(y) of the flicker component, and outputs the observed value ratio(y) to the reference value integration unit 25.

In Step S27, the reference value generation unit 24 generates the reference values $\cos(\omega y)$ and $\sin(\omega y)$ corresponding to the target row and outputs the reference values $\cos(\omega y)$ and $\sin(\omega y)$ to the reference value integration unit 25. In Step S28, the reference value integration unit 25 multiplies the observed value ratio(y)−1 by each of the reference values $\cos(\omega y)$ and $\sin(\omega y)$, the observed value ratio(y)−1 being input from the integration ratio calculation unit 23, the reference values $\cos(\omega y)$ and $\sin(\omega y)$ being input from the reference value generation unit 24, and then integrates those results and the results of the previous multiplication.

In Step S29, the image processing unit 12 determines whether all the rows of the detection area to be processed are selected as target rows. When there is a row that is not selected, the processing is returned to Step S23 and repeated from Step S23. When there is no row that is not selected, i.e., when all the rows of the detection area to be processed are selected as target rows, the processing proceeds to Step S30.

In Step S30, the reference value integration unit 25 outputs $\Sigma(\text{ratio}(y)-1)\cdot\cos(\omega y)$ and $\Sigma(\text{ratio}(y)-1)\cdot\sin(\omega y)$, which are integrated by then, to the flicker parameter estimation unit 26. The flicker parameter estimation unit 26 applies the input from the reference value integration unit 25 to the formula (10), and thus estimates the flicker parameters $C_{a\,i}$ and $S_{a\,i}$ corresponding to the current detection area to be processed and outputs the flicker parameters $C_{a\,i}$ and $S_{a\,i}$ to the first exposure image flicker correction unit 27.

In Step S31, the detection area setting unit 51 determines whether all the detection areas are selected as areas to be processed. When there is a detection area that is not selected, the processing is returned to Step S22 and repeated from Step S22. When there is no detection area that is not selected, i.e., when all the detection areas are selected as detection areas to be processed and the flicker parameters $C_{a\,i}$ and $S_{a\,i}$ corresponding to the respective detection areas are already estimated, the processing proceeds to Step S32.

In Step S32, the whole flicker parameter estimation unit 71 estimates flicker parameters $C_w$ and $S_w$ of the whole image on the basis of the flicker parameters $C_{a\,i}$ and $S_{a\,i}$ estimated for each detection area by the flicker parameter designation unit 26.

In Step S33, the flicker intensity estimation unit 72 estimates a flicker generation intensity distribution on the basis of the estimated flicker parameters $C_w$ and $S_w$ of the whole image and the flicker parameters $C_{a\,i}$ and $S_{a\,i}$ estimated for each detection area. Additionally, on the basis of the estimated flicker generation intensity distribution, the flicker intensity estimation unit 61 sets an application intensity of the correction coefficient by which the pixel value of the first exposure image is multiplied in the first exposure image flicker correction unit 27, and notifies the first exposure image flicker correction unit 27 of the application intensity.

In Step S34, the first exposure image flicker correction unit 27 selects all the pixels of the first exposure image one by one as a pixel to be corrected. In Step S35, the first exposure image flicker correction unit 27 restores the waveform of the flicker component from the flicker parameters C and S input from the flicker parameter estimation unit 26, and multiplies the reciprocal of the flicker intensity of the row, to which the pixel to be corrected belongs, by the application intensity based on the flicker generation intensity distribution, to calculates a correction coefficient.

In Step S36, the first exposure image flicker correction unit 27 determines whether a flicker phenomenon is generated at the position of the pixel to be corrected. When a flicker phenomenon is generated, for Step S37, the first exposure image flicker correction unit 27 multiplies the pixel value of the pixel to be corrected by the correction coefficient, to generate a pixel value of a flicker-corrected first exposure image. When a flicker phenomenon is not generated, Step S37 is skipped.

In Step S38, the first exposure image flicker correction unit 27 determines whether all the pixels of the first exposure image are selected as pixels to be corrected. When there is a pixel that is not selected, the processing is returned to Step S34 and repeated from Step S34. When there is no pixel that is not selected, i.e., when all the pixels of the first exposure image are selected as pixels to be corrected, the flicker correction processing is terminated.

It should be noted that the generated flicker-corrected first exposure image is output to the HDR image generation unit 13 of a subsequent stage from the image processing unit 12, together with the second exposure image for which correction is unnecessary. The description of the flicker correction processing by the seventh configuration of the image processing unit 12 is thus terminated.

<Eighth Configuration Example of Image Processing Unit 12>

Figure 21:
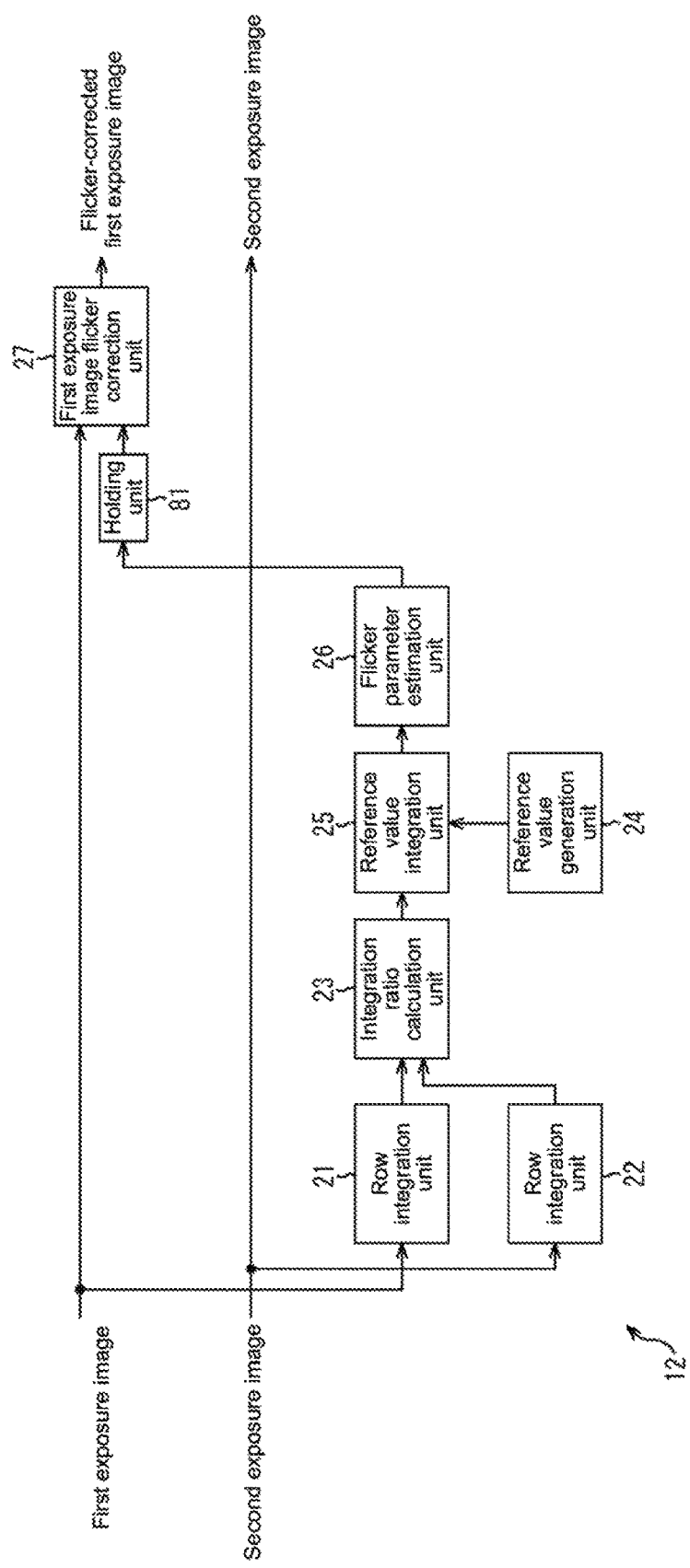
FIG. 21 is a block diagram of an eighth configuration example of the image processing unit.

FIG. 21 shows still another configuration example (eighth configuration example) of the image processing unit 12.

The eighth configuration example is provided by adding a holding unit 81 to the fifth configuration example shown in FIG. 13. The holding unit 81 holds the flicker parameters C and S, which are output from the flicker parameter estimation unit 26 and estimated in almost real time, by a predetermined frame number (for example, 1 frame) and then outputs the flicker parameters C and S to the first exposure image flicker correction unit 27. The first exposure image flicker correction unit 27 restores the waveform of the flicker component on the basis of the input flicker parameters C and S, shifts the phase by an amount corresponding to delay, and then calculates the reciprocal thereof as a correction coefficient, to correct the first exposure image.

According to the eighth configuration example, flicker generated in the current frame can be corrected using the flicker parameters estimated on the basis of a previous frame. Therefore, this can be applied to a case where the flicker parameters cannot be estimated in real time, for example.

<Ninth Configuration Example of Image Processing Unit 12>

Figure 22:
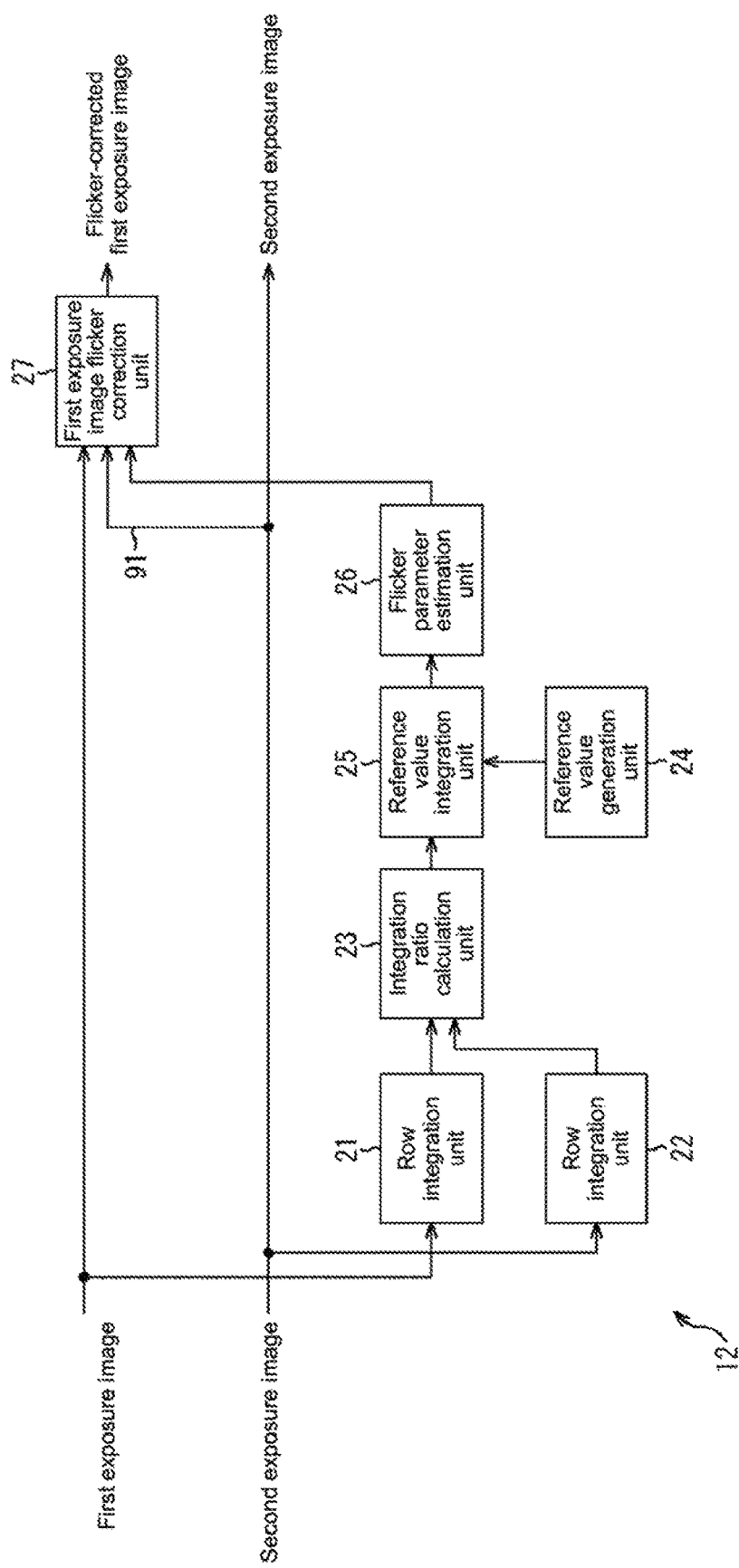
FIG. 22 is a block diagram of a ninth configuration example of the image processing unit.

FIG. 22 shows still another configuration example (ninth configuration example) of the image processing unit 12.

The ninth configuration example is provided by adding a line 91 to the fifth configuration example shown in FIG. 13. The line 91 supplies the second exposure image to the first exposure image flicker correction unit 27.

In this case, in the first exposure image flicker correction unit 27, a correction coefficient for correcting the first exposure image is modulated on the basis of the pixel value of the second exposure image.

According to the ninth configuration example, for example, when a correction coefficient in a gain-up direction is applied, the correction coefficient can be modulated so as to weaken the correction when the pixel value of the flicker-corrected first exposure image largely exceeds the corresponding pixel value of the second exposure image.

<Tenth Configuration Example of Image Processing Unit 12>

Figure 23:
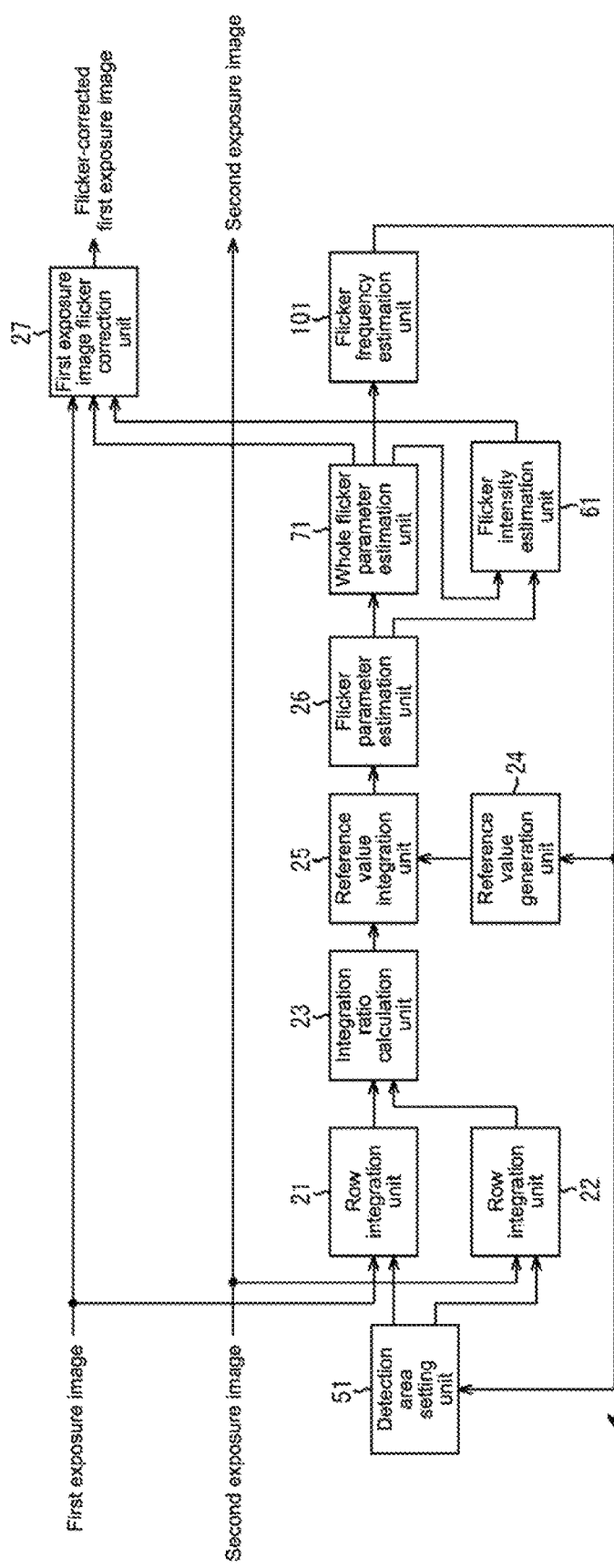
FIG. 23 is a block diagram of a tenth configuration example of the image processing unit.

FIG. 23 shows still another configuration example (tenth configuration example) of the image processing unit 12.

The tenth configuration example is provided by adding a flicker frequency estimation unit 101 to the seventh configuration example shown in FIG. 19.

As described above, the flicker period (frequency) is assumable on the basis of the frequency of the AC power supply that drives the lighting and imaging settings (shutter interval etc.) of the image sensor 10. However, when the frequency of the AC power supply is subtly shifted from a prescribed value, a real flicker period may be shifted from the estimated value. The tenth configuration example can cope with such a case.

The flicker frequency estimation unit 101 estimates the flicker period on the basis of a temporal transition of the flicker parameters, and notifies the reference value generation unit 24 and the detection area setting unit 51 of the flicker period. In this case, the reference value generation unit 24 can adaptively generate the reference values for the notified flicker period. Further, the detection area setting unit 51 can adaptively reset the detection areas for the notified flicker period.

<Estimation of Flicker Period>

Figure 24:
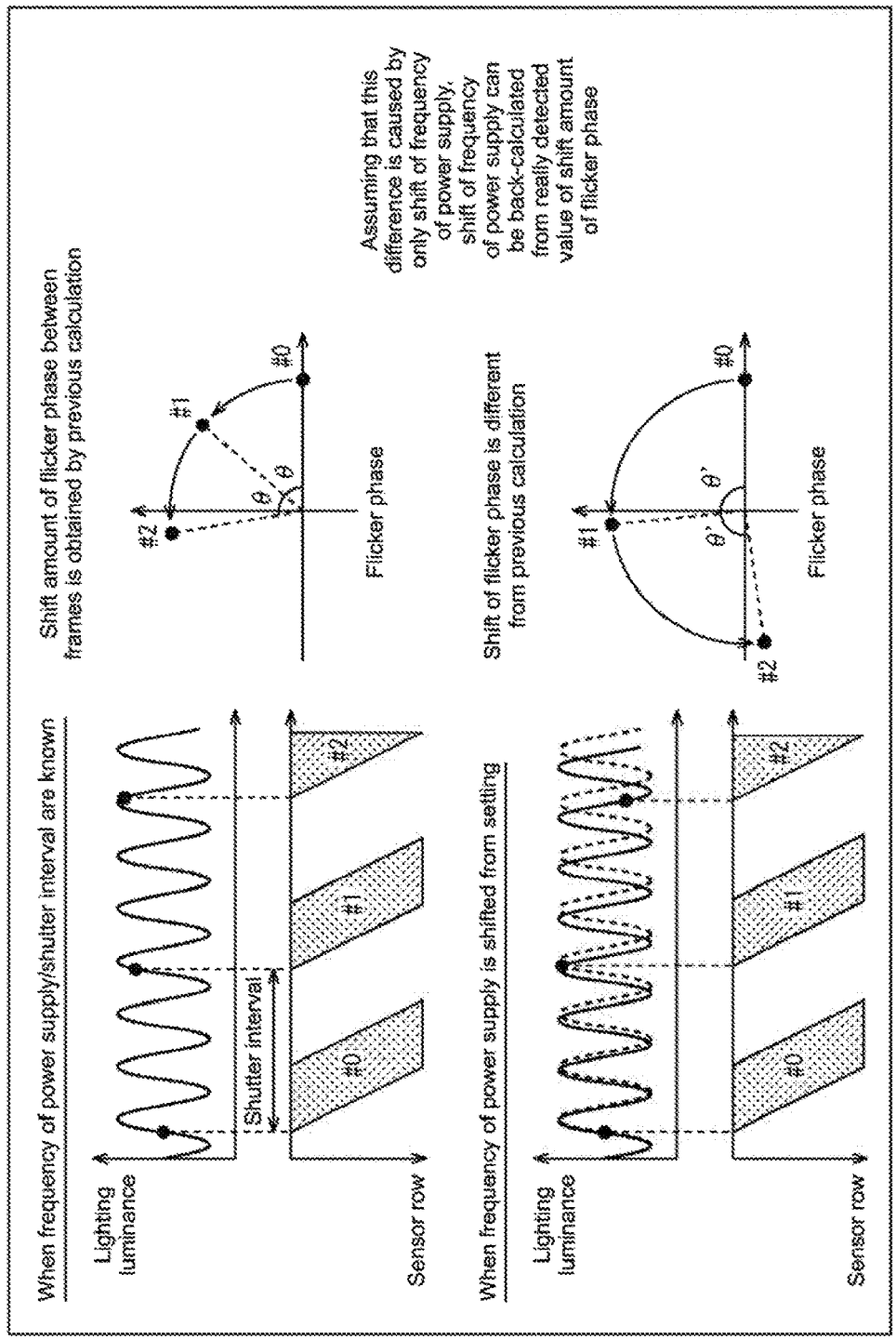
FIG. 24 is a diagram showing rotation of a flicker phase between frames.

FIG. 24 is a diagram for describing a method of estimating the flicker period in the flicker frequency estimation unit 101.

As shown at the same time, when the frequency of the AC power supply that drives the lighting has a prescribed value and is stable, a flicker phase θ between imaged frames is also stable. To the contrary, the frequency of the AC power supply that drives the lighting is shifted from a prescribed value, a flicker phase θ' between imaged frames has a value different from θ previously calculated. In this regard, the shift of the frequency of the AC power supply is back-calculated from the actually detected shift amount of the flicker phase, and a flicker period is actually estimated. This will be more specifically described below.

When an observed value of the flicker component that fluctuates at a flicker frequency (0 real, ratio(y)=$C_{real}$·sin($\omega_{real}Y$)+$S_{real}$·cos($\omega_{real}y$), is detected by a reference frequency $\omega_{set}$, and when an integral interval is detected by $2\pi/\omega_{set}$, estimation results of the flicker parameters C and S are as expressed by the following formula (13), where $\Delta_\omega = \omega_{real} - \omega_{set}$ and N is a sample number in the integral interval.

$$\begin{pmatrix} C \\ S \end{pmatrix} = \begin{pmatrix} \sum_y \sin^2(\omega_{set}y) & \sum_y \sin(\omega_{set}y)\cos(\omega_{set}y) \\ \sum_y \sin(\omega_{set}y)\cos(\omega_{set}y) & \sum_y \cos^2(\omega_{set}y) \end{pmatrix}^{-1} \cdot \begin{pmatrix} \sum_y (C_{real}\cdot\sin(\omega_{real}y) + S_{real}\cdot\cos(\omega_{real}y))\cdot\sin(\omega_{set}y) \\ \sum_y (C_{real}\cdot\sin(\omega_{real}y) + S_{real}\cdot\cos(\omega_{real}y))\cdot\cos(\omega_{set}y) \end{pmatrix}$$

$$= \frac{1}{N} \cdot \begin{pmatrix} \sum_y \cos(\Delta_\omega y)(1-\cos(2\omega_{set}y)) + \sin(\Delta_\omega y)\sin(2\omega_{set}y) & \sum_y \sin(\Delta_\omega y)(-1+\cos(2\omega_{set}y)) + \cos(\Delta_\omega y)\sin(2\omega_{set}y) \\ \sum_y \sin(\Delta_\omega y)(1+\cos(2\omega_{set}y)) + \cos(\Delta_\omega y)\sin(2\omega_{set}y) & \sum_y \cos(\Delta_\omega y)(1+\cos(2\omega_{set}y)) - \sin(\Delta_\omega y)\sin(2\omega_{set}y) \end{pmatrix} \cdot \begin{pmatrix} C_{real} \\ S_{real} \end{pmatrix}$$

(13)

Here, when $\Delta_\omega y$ is minute, it can be considered that $\cos(\Delta_\omega y) \approx 1$ and $\sin(\Delta_\omega y) \approx 0$. Thus, the estimation results of the flicker parameters C and S are matched with real values as expressed by the following formula (14).

$$\begin{pmatrix} C \\ S \end{pmatrix} \approx \begin{pmatrix} C_{real} \\ S_{real} \end{pmatrix}$$

(14)

Further, when $\Delta_\omega y$ is minute, the estimated C and S can be used to estimate a shift of the AC frequency of the drive power. The following formula (15) expresses a function ph_rot($T_{interval}$,T) indicating how many times the phase of the waves in the period T rotates at a shutter interval $T_{interval}$ in the pixel unit 11 of the image sensor 10. It should be noted that the phase is given by a value from κ to 1.

$$\text{ph\_rot}(T_{interval}, T) = \frac{T_{interval} - \text{int}\left(\frac{T_{interval}}{T}\right) \cdot T}{T} \quad (15)$$

Here, assuming that a real flicker period $T_{real}$ is detected and corrected by a flicker period $T_{Set}$ calculated from the prescribed value of the AC frequency of the drive power supply, a phase rotation between the frames is actually ph_rot($T_{interval}, T_{real}$), whereas a phase rotation between the frames after the detection and correction is ph_rot($T_{interval}, T_{Set}$). The difference, a flicker shift amount ph_diff, is as follows: ph_diff=ph_rot($T_{interval}, T_{Set}$)−ph_rot($T_{interval}, T_{real}$).

Therefore, from the formula (14) and the formula (15), the real flicker period $T_{real}$ can be calculated as the following formula (16).

$$T_{real} = \frac{T_{interval}}{N + \text{ph\_rot}(T_{interval}, T_{set}) - \text{ph\_diff}} \quad (16)$$

However, as shown in the following formula (17), N in the formula (16) is an integer that represents a number at which the real flicker period $T_{real}$ falls within time of the shutter interval $T_{interval}$.

$$N = \text{int}\left(\frac{T_{interval}}{T_{real}}\right) \quad (17)$$

Since the integer N is unknown, the real flicker period $T_{real}$ causes ambiguity, which results from the integer N, and thus cannot be determined uniquely. However, when a range of value is set for the real flicker period $T_{real}$ and a value approximate to $T_{set}$, which is calculated from the prescribed value of the AC frequency of the drive power supply, is selected therefor, the ambiguity resulting from the integer N can be solved temporally. It should be noted that the ambiguity resulting from the integer N can also be solved spatially.

Figure 25:
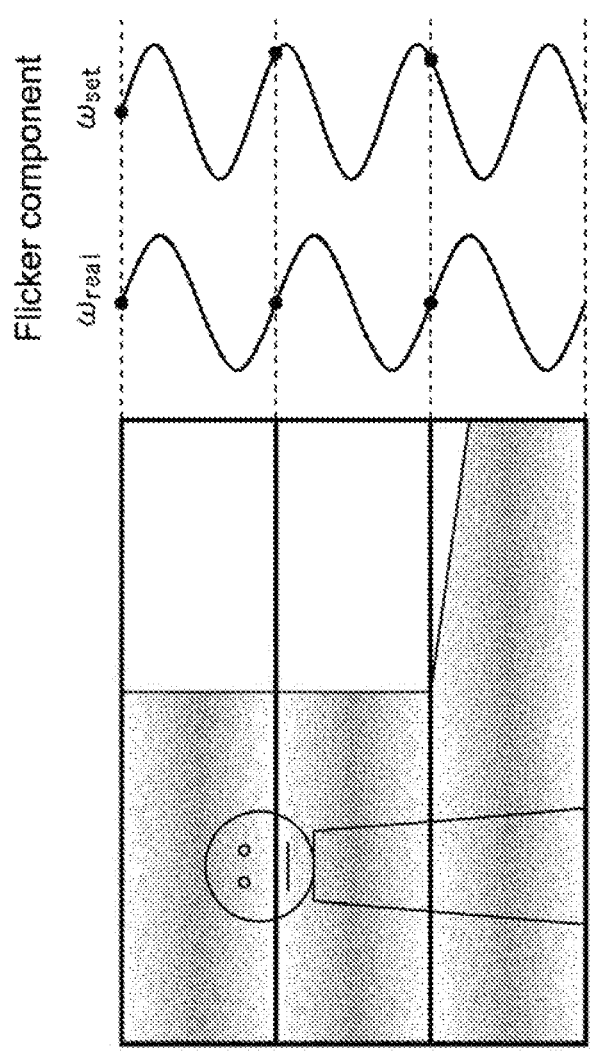
FIG. 25 is a diagram for describing a method of estimating a flicker period.

FIG. 25 is a diagram for describing a method of spatially solving the ambiguity resulting from the integer N.

First, the flicker parameters C and S are estimated for each area in which the segmented detection areas are horizontally connected, that is, for each area in which the image is perpendicularly divided, and the assembly of candidates of the period $T_{real}$ estimated therefrom is assumed as $M_f$.

When the image is perpendicularly divided, a flicker phase estimated from each area is rotated in accordance with the perpendicular position. Therefore, when the real flicker frequency is shifted from the flicker frequency calculated on the basis of the AC frequency of the power supply, as described above, the rotation amount of the flicker phase between the frames is shifted and, similarly, the rotation amount of the flicker phase in the perpendicular direction is also shifted. In this regard, similar to the above-mentioned method, the period $T_{real}$ may be estimated using the shift in the rotation amount of the flicker phase in the perpendicular direction, and with the assembly of those candidates of the period $T_{real}$ being assumed as $M_v$, the assemblies $M_f$ and $M_v$ may be referred to, to determine the period $T_{real}$.

CONCLUSIONS

As described above, according to the first to tenth configuration examples of the image processing unit 12 in this embodiment, a memory for holding the flicker waveform is unnecessary, and the flicker parameters C and S can be obtained in one-pass. Therefore, flicker correction can be performed while a hardware configuration or processing time is reduced.

Further, since the flicker parameters can be estimated from not a past frame but the current frame, flicker of a long period or the like can be corrected irrespective of the period thereof.

<Modified Example of Approximation Formula of Flicker Component>

In this embodiment described above, the flicker component is approximated by sine waves, but approximation may be performed by adding reference values orthogonal to each other. At that time, integration with the respective reference values in the reference value integration unit 25 can be processed in parallel.

For example, the first to N-th order sine waves are orthogonal to one another, and the flicker component can thus be approximated by adding the first to N-th order sine waves to one another as shown in the following formula (18).

$$\hat{r} = \sum_{n=1}^{N} (C_n \sin(n\omega y) + S_n \cos(n\omega y)) + 1 \quad (18)$$

In this case, in the reference value integration unit 25, the row integration value, the integration values (ratio$_y$−1)·COS(n$\omega$y), (ratio$_y$−1)·COS(n$\omega$y), and integration values of reference values, $\sin^2(n\omega y)$, $\sin(n\omega y)\cos(n\omega y)$, $\cos^2(n\omega y)$, are calculated and integrated. However, n is an integer from 1 to N.

Further, in the flicker parameter estimation unit 26, according to the following formula (19), flicker parameters $C_n$ and $S_n$ in each order n can be estimated in parallel.

$$\begin{pmatrix} C_n \\ S_n \end{pmatrix} = \begin{pmatrix} \sum \sin^2(n\omega y) & \sum \sin(n\omega y)\cos(n\omega y) \\ \sum \sin(n\omega y)\cos(n\omega y) & \sum \cos^2(n\omega y) \end{pmatrix}^{-1} \cdot \begin{pmatrix} \sum (\text{ratio}_y - 1) \cdot \sin(n\omega y) \\ \sum (\text{ratio}_y - 1) \cdot \cos(n\omega y) \end{pmatrix} \quad (19)$$

<Modified Example of Generation of Reference Values>

In this embodiment described above, the flicker parameters are estimated using the least-square method, but the flicker parameters may be estimated using an analytical technique other than the least-square method.

Figure 26:
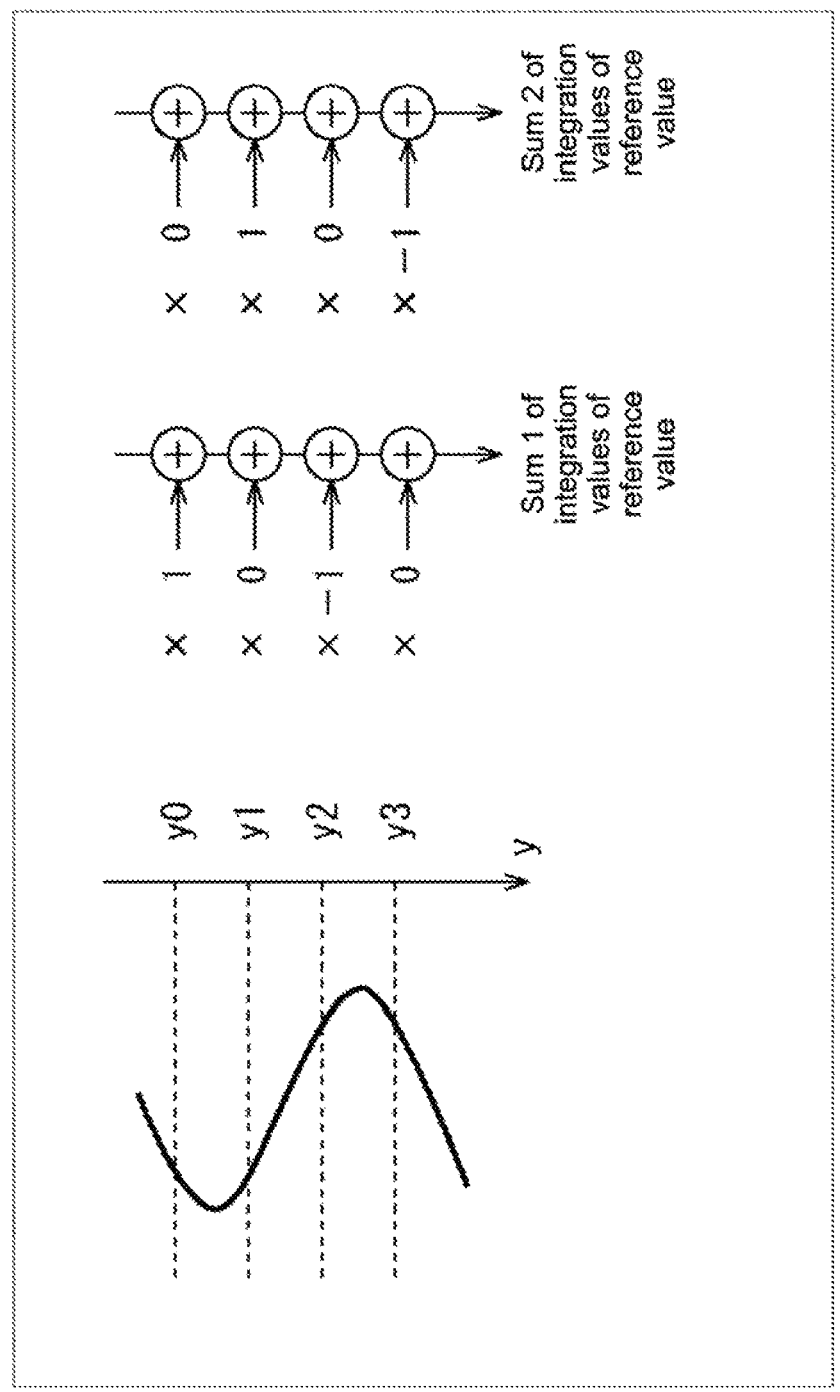
FIG. 26 is a diagram for describing a method of estimating a flicker period by an analytical technique other than a least-square method.

For example, as shown in FIG. 26, the pixel values may be integrated for each row at ¼ intervals of the flicker period that appears in the image, to calculate a row integration ratio.

In this case, observed values $r_0$, $r_1$, $r_2$, and $r_3$ at $y_0$, $y_1$, $y_2$, and $y_3$, respectively, can be approximated as expressed by the following formula (20).

$r_0 = C \sin \omega y_0 + S \cos \omega y_0 + d$ $r_1 = C \sin \omega y_1 + S \cos \omega y_1 + d$ $r_2 = C \sin \omega y_2 + S \cos \omega y_2 + d$ $r_3 = C \sin \omega y_3 + S \cos \omega y_3 + d \quad (20)$ It should be noted that $\omega y_1$, $\omega y_2$, and $\omega y_3$ can be rewritten using $\omega y_0$ as expressed by the formula (21).

$$\omega y_1 = \omega y_0 + \frac{\pi}{2},\ \omega y_2 = \omega y_0 + \frac{\pi}{2},\ \omega y_3 = \omega y_0 + \frac{3\pi}{2} \quad (21)$$

Therefore, the formula (20) can be rewritten as expressed by the following formula (22).

$r_0 = C \sin \omega y_0 + S \cos \omega y_0 + d$ $r_1 = C \cos \omega y_0 - S \sin \omega y_0 + d$ $r_2 = -C \sin \omega y_0 - S \cos \omega y_0 + d$ $r_3 = -C \cos \omega y_0 + S \sin \omega y_0 + d$ (22)

The formula (22) is solved for C, S, and the following formula (23) can thus be obtained. In other words, the flicker parameters C and S can be analytically obtained.

$$C = \frac{(r_0 - r_2)\sin\omega y_0 + (r_1 - r_3)\cos\omega y_0}{2} \quad (23)$$

$$S = \frac{(r_0 - r_2)\cos\omega y_0 - (r_1 - r_3)\sin\omega y_0}{2}$$

In other words, in this case, it can be said that, as shown in FIG. 26, two reference values can be set and the flicker parameters C and S can be analytically obtained from the respective sums of the integration results.

Additionally, the flicker parameters C and S may be estimated by orthogonal detection using the following formula (24), in addition to the example shown in FIG. 26.

$$I_S = \int_0^T r(y) \cdot \sin(\omega y)\, dy = \frac{AT}{2}\cos\theta \quad (24)$$

$$I_C = \int_0^T r(y) \cdot \cos(\omega y)\, dy = \frac{AT}{2}\sin\theta$$

$$\Rightarrow \begin{cases} A = \sqrt{\frac{4}{T}(I_S^2 + I_C^2)} \\ \theta = \operatorname{atan2}(I_S, I_C) \end{cases}$$

<Configuration Example of Computer>

Incidentally, the above-mentioned series of processing of the image processing unit 12 can be executed by hardware or software. When the series of processing is executed by software, a program constituting the software is installed in a computer. Here, the computer includes a computer incorporated in dedicated hardware, a general-purpose personal computer that can execute various functions by installing various programs therein, and the like.

Figure 27:
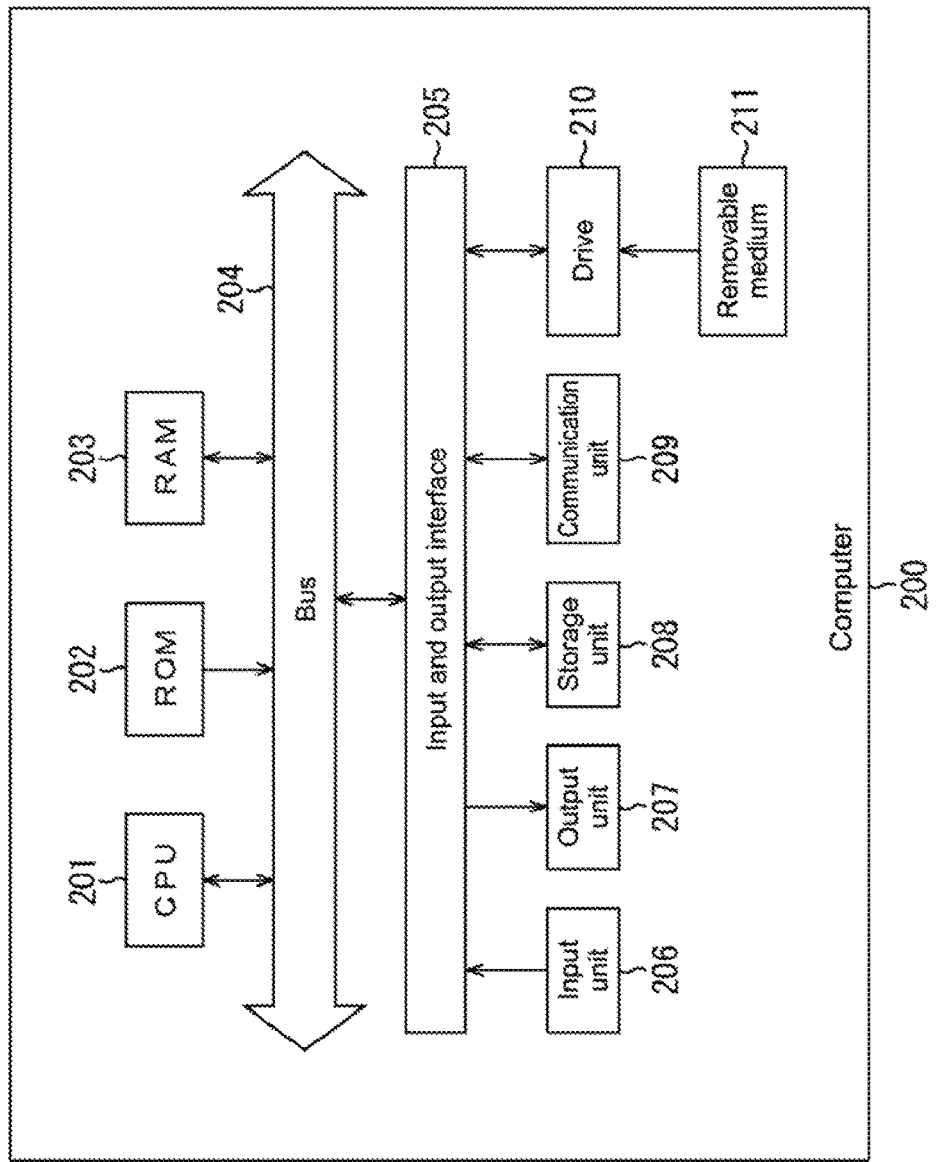
FIG. 27 is a block diagram of a configuration example of a computer.

FIG. 27 is a block diagram of a hardware configuration example of the computer that executes the series of processing described above by a program.

In the computer, a CPU (Central Processing Unit) 201, a ROM (Read Only Memory) 202, and a RAM (Random Access Memory) 203 are connected to one another via a bus 204.

Additionally, an input and output interface 205 is connected to the bus 204. An input unit 206, an output unit 207, a storage unit 208, a communication unit 209, and a drive 210 are connected to the input and output interface 205.

The input unit 206 is constituted by a keyboard, a mouse, a microphone, and the like. The output unit 207 is constituted by a display, a speaker, and the like. The storage unit 208 is constituted by a hard disk, a non-volatile memory, and the like. The communication unit 209 is constituted by a network interface and the like. The drive 210 drives a removable medium 211 such as a magnetic disk, an optical disc, a magneto-optical disk, and a semiconductor memory.

In the computer 200 configured as described above, the CPU 201 loads a program stored in the storage unit 208 into the RAM 203 via the input and output interface 205 and the bus 204 for execution, for example, to perform the series of processing described above.

It should be noted that the program executed by the computer 200 may be a program that is processed chronologically along the order described in this specification or may be a program that is processed in parallel or at a necessary timing such as when an invocation is performed.

It should be noted that the embodiment of the present disclosure is not limited to the embodiment described above and can be variously modified without departing from the gist of the present disclosure.

The present disclosure can have the following configurations.

(1) An image processing apparatus, including:

a first row integration unit that integrates pixel values of a first exposure image for each row, to calculate a first row integration value for each row, the first exposure image being captured for a first exposure time by rolling shutter;

a second row integration unit that integrates pixel values of a second exposure image for each row, to calculate a second row integration value for each row, the second exposure image having a subject and an angle of view common to the first exposure image and being captured for a second exposure time by rolling shutter, the second exposure time including a time period overlapping with the first exposure time;

a row integration ratio calculation unit that divides the first row integration value by the second row integration value for each row, to calculate a row integration ratio;

a reference value generation unit that generates a reference value for each row;

a reference value integration unit that multiplies the integration ratio by the reference value for each row and integrates multiplication results respectively corresponding to all rows, to calculate a sum of the multiplication results from the integration ratio and the reference value;

a flicker parameter estimation unit that estimates a flicker parameter of flicker generated in the first exposure image on the basis of the sum; and a flicker correction unit that corrects the flicker generated in the first exposure image on the basis of the estimated flicker parameter.

(2) The image processing apparatus according to (1), in which the second exposure time for which the second exposure image is captured is an integral multiple of a period of flicker that may be generated in the first exposure image, the integral multiple of a period being a flickerless shutter time.

(3) The image processing apparatus according to (1) or (2), in which the row integration ratio calculation unit divides the first row integration value, in which a difference in exposure time is adjusted for each row, by the second row integration value, to calculate a row integration ratio.

(4) The image processing apparatus according to any one of (1) to (3), in which the flicker parameter estimation unit estimates the flicker parameter of the flicker generated in the first exposure image on the basis of the sum by using a least-square method.

(5) The image processing apparatus according to any one of (1) to (4), in which the flicker parameter estimation unit estimates an amplitude and a phase as the flicker parameters on the basis of the sum when a component of the flicker generated in the first exposure image is approximated by a sine wave.

(6) The image processing apparatus according to any one of (1) to (5), further including an integration weighting setting unit that sets an integration weighting factor by which the pixel value is multiplied when the pixel values are integrated for each row in each of the first row integration unit and the second row integration unit.

(7) The image processing apparatus according to any one of (1) to (6), in which the reference value integration unit multiplies the integration ratio by the reference value for each row and multiplies each of the multiplication results respectively corresponding to all the rows by a weighting factor to be integrated, to calculate the sum of the multiplication results from the integration ratio and the reference value.

(8) The image processing apparatus according to any one of (1) to (5), in which the first row integration unit, the second row integration unit, the row integration ratio calculation unit, the reference value generation unit, the reference value integration unit, the flicker parameter estimation unit, and the flicker correction unit are provided for each color channel of the pixel values.

(9) The image processing apparatus according to any one of (1) to (5), further including a luminance generation unit that generates a luminance from each color channel component of the pixel values, in which the first row integration unit, the second row integration unit, the row integration ratio calculation unit, the reference value generation unit, the reference value integration unit, and the flicker parameter estimation unit regard the luminance as the pixel value, to estimate the flicker parameter based on the luminance, and the flicker correction unit corrects the flicker generated in the first exposure image for each color channel on the basis of the flicker parameter estimated on the basis of the luminance.

(10) The image processing apparatus according to any one of (1) to (5), further including a detection area setting unit that sets detection areas for the first exposure image and the second exposure image, in which the first row integration unit, the second row integration unit, the row integration ratio calculation unit, the reference value generation unit, the reference value integration unit, and the flicker parameter estimation unit execute respective processing for each of the detection areas, to estimate the flicker parameter for each of the detection areas.

(11) The image processing apparatus according to (10), further including a flicker intensity estimation unit that estimates a generation intensity distribution of the flicker on the basis of the estimated flicker parameter for each of the detection areas, in which the flicker correction unit corrects the flicker generated in the first exposure image also on the basis of the estimated generation intensity distribution of the flicker.

(12) The image processing apparatus according to (10), further including a whole flicker parameter estimation unit that estimates the flicker parameter of a whole image on the basis of the estimated flicker parameter for each of the detection areas, in which the flicker intensity estimation unit estimates the generation intensity distribution of the flicker on the basis of the estimated flicker parameter for each of the detection areas and the flicker parameter of the whole image.

(13) The image processing apparatus according to any one of (1) to (12), in which the flicker correction unit corrects the flicker generated in the first exposure image in a current frame on the basis of the flicker parameter estimated from the first exposure image and the second exposure image in the current frame.

(14) The image processing apparatus according to any one of (1) to (13), further including a holding unit that holds the flicker parameter estimated from the first exposure image and the second exposure image in a frame previous to the current frame, in which the flicker correction unit corrects the flicker generated in the first exposure image in the current frame on the basis of the held flicker parameter.

(15) The image processing apparatus according to any one of (1) to (14), in which the flicker correction unit corrects the flicker generated in the first exposure image in the current frame on the basis of the estimated flicker parameter and the second exposure image.

(16) The image processing apparatus according to any one of (1) to (15), further including a flicker frequency estimation unit that estimates a period of the flicker generated in the first exposure image on the basis of a temporal or spatial transition of the estimated flicker parameter.

(17) The image processing apparatus according to (10), in which the detection area setting unit sets the detection areas for the first exposure image and the second exposure image on the basis of an estimated period of the flicker.

(18) An image processing method for an image processing apparatus, including the steps of:

by the image processing apparatus, integrating pixel values of a first exposure image for each row, to calculate a first row integration value for each row, the first exposure image being captured for a first exposure time by rolling shutter;

integrating pixel values of a second exposure image for each row, to calculate a second row integration value for each row, the second exposure image having a subject and an angle of view common to the first exposure image and being captured for a second exposure time by rolling shutter, the second exposure time including a time period overlapping with the first exposure time;

dividing the first row integration value by the second row integration value for each row, to calculate a row integration ratio;

generating a reference value for each row;

multiplying the integration ratio by the reference value for each row and integrating multiplication results respectively corresponding to all rows, to calculate a sum of the multiplication results from the integration ratio and the reference value;

estimating a flicker parameter of flicker generated in the first exposure image on the basis of the sum; and correcting the flicker generated in the first exposure image on the basis of the estimated flicker parameter.

(19) A program that causes a computer to function as:
a first row integration unit that integrates pixel values of a first exposure image for each row, to calculate a first row integration value for each row, the first exposure image being captured for a first exposure time by rolling shutter;
a second row integration unit that integrates pixel values of a second exposure image for each row, to calculate a second row integration value for each row, the second exposure image having a subject and an angle of view common to the first exposure image and being captured for a second exposure time by rolling shutter, the second exposure time including a time period overlapping with the first exposure time;
a row integration ratio calculation unit that divides the first row integration value by the second row integration value for each row, to calculate a row integration ratio;
a reference value generation unit that generates a reference value for each row;
a reference value integration unit that multiplies the integration ratio by the reference value for each row and integrates multiplication results respectively corresponding to all rows, to calculate a sum of the multiplication results from the integration ratio and the reference value;
a flicker parameter estimation unit that estimates a flicker parameter of flicker generated in the first exposure image on the basis of the sum; and
a flicker correction unit that corrects the flicker generated in the first exposure image on the basis of the estimated flicker parameter.

(20) An image sensor, including:
a pixel unit; and
an image processing unit,
the pixel unit being capable of setting an exposure condition for each pixel and outputting a first exposure image and a second exposure image to the image processing unit, the first exposure image being obtained by reading pixels set to a first exposure time by rolling shutter, the second exposure image having a subject and an angle of view common to the first exposure image and being obtained by reading pixels set to a second exposure time by rolling shutter, the second exposure time including a time period overlapping with the first exposure time,
the image processing unit including
a first row integration unit that integrates pixel values of the first exposure image for each row, to calculate a first row integration value for each row,
a second row integration unit that integrates pixel values of the second exposure image for each row, to calculate a second row integration value for each row,
a row integration ratio calculation unit that divides the first row integration value by the second row integration value for each row, to calculate a row integration ratio,
a reference value generation unit that generates a reference value for each row,
a reference value integration unit that multiplies the integration ratio by the reference value for each row and integrates multiplication results respectively corresponding to all rows, to calculate a sum of the multiplication results from the integration ratio and the reference value,
a flicker parameter estimation unit that estimates a flicker parameter of flicker generated in the first exposure image on the basis of the sum, and
a flicker correction unit that corrects the flicker generated in the first exposure image on the basis of the estimated flicker parameter.

REFERENCE SIGNS LIST 10 image sensor
11 pixel unit
12 image processing unit
13 HDR image generation unit
21 row integration unit
22 row integration unit
23 integration ratio calculation unit
24 reference value generation unit
25 reference value integration unit
26 flicker parameter estimation unit
27 first exposure image flicker correction unit
31 integration weighting setting unit
41 luminance generation unit
42 luminance generation unit
51 detection area setting unit
61 flicker intensity estimation unit
71 whole flicker parameter estimation unit
81 delay unit
101 flicker frequency estimation unit
200 computer
201 CPU

The invention claimed is:
1. An image processing apparatus, comprising:
a central processing unit (CPU) configured to:
integrate a plurality of pixel values of a first exposure image for each row of a plurality of rows of the first exposure image;
calculate a first row integration value for each row of the plurality of rows of the first exposure image based on the integration of the plurality of pixel values of the first exposure image, wherein the first exposure image is captured for a first exposure time by rolling shutter;
integrate a plurality of pixel values of a second exposure image for each row of a plurality of rows of the second exposure image, wherein the second exposure image is captured for a second exposure time by the rolling shutter;
calculate a second row integration value for each row of the plurality of rows of the second exposure image based on the integration of the plurality of pixel values of the second exposure image, wherein
the second exposure image includes a subject and an angle of view common to the first exposure image, and
the second exposure time includes a time period that overlaps with the first exposure time;
calculate a row integration ratio based on a division of the first row integration value by the second row integration value, wherein the row integration ratio is calculated for each row of the plurality of rows of the first exposure image, and for each row of the plurality of rows of the second exposure image;
generate a reference value for each row of the plurality of rows of the first exposure image and for each row of the plurality of rows of the second exposure image;
multiply the row integration ratio by the reference value for each row of the plurality of rows of the first exposure image, and for each row of the plurality of rows of the second exposure image;
integrate a plurality of multiplication results of the multiplication corresponding to the plurality of rows of the first exposure image and the plurality of rows of the second exposure image;

calculate a sum of the plurality of multiplication results based on the integration of the plurality of multiplication results;

estimate a flicker parameter of a flicker in the first exposure image based on the sum; and correct the flicker in the first exposure image based on the estimated flicker parameter.

2. The image processing apparatus according to claim 1, wherein the second exposure time is an integral multiple of a period of the flicker, and the integral multiple of the period of the flicker corresponds to a flickerless shutter time.

3. The image processing apparatus according to claim 2, wherein the CPU is further configured to:

adjust a difference between the first exposure time and the second exposure time in the first row integration value; and calculate the row integration ratio based on the difference.

4. The image processing apparatus according to claim 2, wherein the CPU is further configured to estimate the flicker parameter of the flicker based on a least-square method.

5. The image processing apparatus according to claim 2, wherein the CPU is further configured to estimate an amplitude and a phase as the flicker parameter based on approximation of a component of the flicker by a sine wave.

6. The image processing apparatus according to claim 2, wherein the CPU is further configured to:

set an integration weighting factor;

multiply the integration weighting factor by a pixel value of the plurality of pixel values of the first exposure image to integrate the plurality of pixel values for each row of the first exposure image; and multiply the integration weighting factor by a pixel value of the plurality of pixel values of the second exposure image to integrate the plurality of pixel values for each row of the second exposure image.

7. The image processing apparatus according to claim 2, wherein the CPU is further configured to:

multiply each of the plurality of multiplication results, respectively corresponding to the plurality of rows of the first exposure image and the plurality of rows of the second exposure image, by a weighting factor;

integrate the multiplied plurality of multiplication results; and calculate the sum of the multiplied plurality of multiplication results from the row integration ratio and the reference value.

8. The image processing apparatus according to claim 2, wherein the CPU is further configured to correct the flicker for each color channel of the plurality of pixel values of the first exposure image.

9. The image processing apparatus according to claim 2, wherein the CPU is further configured to:

generate a luminance from each color channel component of the plurality of pixel values of the first exposure image, wherein the flicker parameter is estimated based on the luminance; and correct the flicker generated in the first exposure image for each color channel component based on the estimated flicker parameter.

10. The image processing apparatus according to claim 1, wherein the CPU is further configured to:

estimate a generation intensity distribution of the flicker based on the flicker parameter for each of a plurality of detection areas; and correct the flicker based on the generation intensity distribution.

11. The image processing apparatus according to claim 1, wherein the CPU is further configured to:

estimate a flicker parameter of a whole image based on the estimated flicker parameter of the flicker in the first exposure image; and estimate a generation intensity distribution of the flicker based on the estimated flicker parameter of the whole image.

12. The image processing apparatus according to claim 2, wherein the CPU is further configured to correct the flicker in the first exposure image in a first frame, based on the estimation of the flicker parameter from the first exposure image and the second exposure image in the first frame.

13. The image processing apparatus according to claim 12, wherein the CPU is further configured to:

hold the flicker parameter estimated from the first exposure image and the second exposure image in a second frame that is previous to the first frame; and correct the flicker in the first exposure image in the first frame based on the held flicker parameter.

14. The image processing apparatus according to claim 2, wherein the CPU is further configured to correct the flicker in the first exposure image in a first frame based on the estimated flicker parameter and the second exposure image.

15. The image processing apparatus according to claim 2, wherein the CPU is further configured to determine a period of the flicker in the first exposure image based on at least one of a temporal transition or a spatial transition of the estimated flicker parameter.

16. An image processing method, comprising:

integrating a plurality of pixel values of a first exposure image for each row of a plurality of rows of the first exposure image;

calculating a first row integration value for each row of the plurality of rows of the first exposure image based on the integration of the plurality of pixel values of the first exposure image, wherein the first exposure image is captured for a first exposure time by rolling shutter;

integrating a plurality of pixel values of a second exposure image for each row of a plurality of rows of the second exposure image, wherein the second exposure image is captured for a second exposure time by the rolling shutter;

calculating a second row integration value for each row of the plurality of rows of the second exposure image based on the integration of the plurality of pixel values of the second exposure image, wherein the second exposure image includes a subject and an angle of view common to the first exposure image, and the second exposure time includes a time period that overlaps with the first exposure time;

calculating a row integration ratio based on a division of the first row integration value by the second row integration value, wherein the row integration ratio is calculated for each row of the plurality of rows of the first exposure image and for each row of the plurality of rows of the second exposure image;

generating a reference value for each row of the plurality of rows of the first exposure image and for each row of the plurality of rows of the second exposure image;

multiplying the row integration ratio by the reference value for each row of the plurality of rows of the first exposure image, and for each row of the plurality of rows of the second exposure image;

integrating a plurality of multiplication results of the multiplication corresponding to the plurality of rows of the first exposure image and the plurality of rows of the second exposure image;
calculating a sum of the plurality of multiplication results based on the integration of the plurality of multiplication results;
estimating a flicker parameter of a flicker in the first exposure image based on the sum; and
correcting the flicker in the first exposure image based on the estimated flicker parameter.

17. A non-transitory computer-readable medium having stored thereon computer-executable instructions that, when executed by a processor, cause the processor to execute operations, the operations comprising:
integrating a plurality of pixel values of a first exposure image for each row of a plurality of rows of the first exposure image;
calculating a first row integration value for each row of the plurality of rows of the first exposure image based on the integration of the plurality of pixel values of the first exposure image, wherein the first exposure image is captured for a first exposure time by rolling shutter;
integrating a plurality of pixel values of a second exposure image for each row of a plurality of rows of the second exposure image, wherein the second exposure image is captured for a second exposure time by the rolling shutter;
calculating a second row integration value for each row of the plurality of rows of the second exposure image based on the integration of the plurality of pixel values of the second exposure image, wherein
the second exposure image includes a subject and an angle of view common to the first exposure image, and
the second exposure time includes a time period that overlaps with the first exposure time;
calculating a row integration ratio based on a division of the first row integration value by the second row integration value, wherein the row integration ratio is calculated for each row of the plurality of rows of the first exposure image and for each row of the plurality of rows of the second exposure image;
generating a reference value for each row of the plurality of rows of the first exposure image and for each row of the plurality of rows of the second exposure image;
multiplying the row integration ratio by the reference value for each row of the plurality of rows of the first exposure image, and for each row of the plurality of rows of the second exposure image;
integrating a plurality of multiplication results of the multiplication corresponding to the plurality of rows of the first exposure image and the plurality of rows of the second exposure image;
calculating a sum of the plurality of multiplication results based on the integration of the plurality of multiplication results;
estimating a flicker parameter of a flicker in the first exposure image based on the sum; and
correcting the flicker in the first exposure image based on the estimated flicker parameter.

18. An image sensor, comprising:
a pixel unit that comprises a plurality of pixels; and
a central processing unit (CPU), wherein
the pixel unit is configured to:
set an exposure condition for each pixel of the plurality of pixels;
obtain a first exposure image based on a reading operation of a first group of pixels of the plurality of pixels, wherein the first group of pixels is set to a first exposure time;
obtain a second exposure image based on a reading operation of a second group of pixels of the plurality of pixels, wherein the second group of pixels is set to a second exposure time; and
output the first exposure image and the second exposure image to the CPU, the CPU is configured to:
integrate a plurality of pixel values of the first exposure image for each row of a plurality of rows of the first exposure image;
calculate a first row integration value for each row of the plurality of rows of the first exposure image based on the integration of the plurality of pixel values of the first exposure image, wherein the first exposure image is captured for the first exposure time by rolling shutter;
integrate a plurality of pixel values of the second exposure image for each row of a plurality of rows of the second exposure image, wherein the second exposure image is captured for the second exposure time by the rolling shutter;
calculate a second row integration value for each row of the plurality of rows of the second exposure image based on the integration of the plurality of pixel values of the second exposure image, wherein
the second exposure image includes a subject and an angle of view common to the first exposure image, and
the second exposure time includes a time period that overlaps with the first exposure time;
calculate a row integration ratio based on a division of the first row integration value by the second row integration value, wherein the row integration ratio is calculated for each row of the plurality of rows of the first exposure image and for each row of the plurality of rows of the second exposure image;
generate a reference value for each row of the plurality of rows of the first exposure image and for each row of the plurality of rows of the second exposure image;
multiply the row integration ratio by the reference value for each row of the plurality of rows of the first exposure image, and for each row of the plurality of rows of the second exposure image;
integrate a plurality of multiplication results of the multiplication corresponding to the plurality of rows of the first exposure image and the plurality of rows of the second exposure image;
calculate a sum of the plurality of multiplication results based on the integration of the plurality of multiplication results;
estimate a flicker parameter of a flicker in the first exposure image based on the sum; and
correct the flicker in the first exposure image based on the estimated flicker parameter.

19. An image processing apparatus, comprising:
a central processing unit (CPU) configured to:
integrate a plurality of pixel values of a first exposure image for each row of a plurality of rows of the first exposure image;
calculate a first row integration value for each row of the plurality of rows of the first exposure image based on the integration of the plurality of pixel values of the first exposure image, wherein the first exposure image is captured for a first exposure time by rolling shutter;

integrate a plurality of pixel values of a second exposure image for each row of a plurality of rows of the second exposure image, wherein the second exposure image is captured for a second exposure time by the rolling shutter;

calculate a second row integration value for each row of the plurality of rows of the second exposure image based on the integration of the plurality of pixel values of the second exposure image, wherein
  the second exposure image includes a subject and an angle of view common to the first exposure image, and
  the second exposure time includes a time period that overlaps with the first exposure time;

calculate a row integration ratio based on a division of the first row integration value by the second row integration value, wherein the row integration ratio is calculated for each row of the plurality of rows of the first exposure image, and for each row of the plurality of rows of the second exposure image;

generate a reference value for each row of the plurality of rows of the first exposure image and for each row of the plurality of rows of the second exposure image;

multiply the row integration ratio by the reference value for each row of the plurality of rows of the first exposure image, and for each row of the plurality of rows of the second exposure image;

integrate a plurality of multiplication results of the multiplication corresponding to the plurality of rows of the first exposure image and the plurality of rows of the second exposure image;

calculate a sum of the plurality of multiplication results based on the integration of the plurality of multiplication results;

estimate a flicker parameter of a flicker in the first exposure image based on the sum and a least-square method; and correct the flicker in the first exposure image based on the estimated flicker parameter.

* * * * *